(12) United States Patent
Kitajima et al.

(10) Patent No.: US 10,799,961 B2
(45) Date of Patent: Oct. 13, 2020

(54) CUTTING INSERT AND INDEXABLE CUTTING TOOL

(71) Applicant: MITSUBISHI MATERIALS CORPORATION, Tokyo (JP)

(72) Inventors: Jun Kitajima, Tokyo (JP); Masashi Kanbara, Tokyo (JP); Shigeru Ishimori, Tokyo (JP); Chinami Sakamoto, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/137,819

(22) Filed: Sep. 21, 2018

(65) Prior Publication Data

US 2019/0240746 A1 Aug. 8, 2019

(30) Foreign Application Priority Data

Feb. 7, 2018 (JP) ................................ 2018-020555

(51) Int. Cl.
*B23C 5/10* (2006.01)
*B23C 5/20* (2006.01)

(52) U.S. Cl.
CPC .............. *B23C 5/202* (2013.01); *B23C 5/109* (2013.01); *B23C 5/207* (2013.01);
(Continued)

(58) Field of Classification Search
CPC .... B23C 2200/0433; B23C 2200/0494; B23C 2200/286; B23C 2200/367; B23C 75/109; B23C 75/202; B23C 75/207
See application file for complete search history.

(56) References Cited

U.S. PATENT DOCUMENTS 3,762,005 A * 10/1973 Erkfritz ................. B23C 5/2213
407/113
4,124,326 A * 11/1978 Cost ...................... B23B 27/141
407/114
(Continued)

FOREIGN PATENT DOCUMENTS

DE 3824348 A1 1/1989
JP 2003-530225 A 10/2003
(Continued)

OTHER PUBLICATIONS

Mitsubishi Materials, Catalog of VPX series products distributed on Sep. 22, 2017, including a partial translation thereof.
(Continued)

*Primary Examiner* — Nicole N Ramos
(74) *Attorney, Agent, or Firm* — Locke Lord LLP

(57) ABSTRACT

A cutting insert includes an insert body; a pair of first surfaces; a through hole extending in a direction of a first axis; a second surface which connects the first surfaces and faces a direction of a second axis orthogonal to the first axis; a third surface which is disposed on the circumferential surface and is connected to the first surfaces and the second surface and faces a direction of a third axis; and cutting edges located at an intersection ridge line between the first surface and the second surface and at an intersection ridge line between the second surface and the third surface. The second surface has a projection part protruding in the direction of the second axis, and as viewed from the direction of the second axis, the through hole and the projection part are disposed to overlap each other.

13 Claims, 14 Drawing Sheets

(52) U.S. Cl.
CPC ........... *B23C 2200/0433* (2013.01); *B23C 2200/0494* (2013.01); *B23C 2200/286* (2013.01); *B23C 2200/367* (2013.01)

(56) References Cited

U.S. PATENT DOCUMENTS

| | | | |
|---|---|---|---|
| 5,333,972 | A | 8/1994 | Bemadic et al. |
| 6,227,772 | B1 | 5/2001 | Heinloth et al. |
| 7,063,489 | B2 * | 6/2006 | Satran .................. B23C 5/1072 407/113 |
| 9,205,499 | B2 * | 12/2015 | Morrison ................ B23C 5/207 |
| 9,475,138 | B2 * | 10/2016 | Morrison .............. B23C 5/2472 |
| 2003/0165363 | A1 | 9/2003 | Wermeister |
| 2004/0022590 | A1 * | 2/2004 | Satran .................. B23C 5/2213 407/40 |
| 2006/0165501 | A1 | 7/2006 | Heinloth |
| 2009/0080991 | A1 | 3/2009 | Grimm et al. |
| 2010/0119313 | A1 | 5/2010 | Hartlohner et al. |
| 2010/0129166 | A1 * | 5/2010 | Hartlohner ......... B23B 27/1618 407/102 |
| 2013/0266392 | A1 * | 10/2013 | Lee ........................ B23C 3/06 409/234 |

FOREIGN PATENT DOCUMENTS

| | | |
|---|---|---|
| JP | 2005-528230 A | 9/2005 |
| JP | 2007-506561 A | 3/2007 |
| JP | 2007-520360 A | 7/2007 |
| JP | 2008-506542 A | 3/2008 |
| JP | 2008-229745 A | 10/2008 |
| JP | 2010-526678 A | 8/2010 |
| JP | 2014-503375 A | 2/2014 |
| WO | 03/101655 A1 | 12/2003 |
| WO | 2005/075135 A1 | 8/2005 |
| WO | 2009/028754 A1 | 3/2009 |
| WO | 2012/104832 A1 | 8/2012 |

OTHER PUBLICATIONS

Mitsubishi Materials, Catalog of VPX series products distributed in MECT2017 (Mechatronics Technology Japan 2017) held in Nagoya, Japan, on Oct. 18 to 21, 2017 including a partial translation thereof.
Mitsubishi Materials, Tools News B250G, Catalog of VPX series, 2017, pp. 1-35 and a cover page.
Mitsubishi Materials, VPX series, Multifunctional cutter for high efficiency processing, published at http://carbide-mmc co.jp/products/rotating_tools/face_mills/vpx on Nov. 10, 2017, pp. 1-6, including a partial translation thereof.
Mitsubishi Materials, Information on campaign distributed on Nov. 21, 2017, pp. 1-19 and a cover page.
Office Action dated Jul. 10, 2018, issued for the Japanese patent application No. 2018-020555 and English translation thereof.

* cited by examiner

CUTTING INSERT AND INDEXABLE CUTTING TOOL

BACKGROUND OF THE INVENTION

Field of the Invention

The present invention relates to a cutting insert and an indexable cutting tool.

Priority is claimed on Japanese Patent Application No. 2018-020555, filed Feb. 7, 2018, the content of which is incorporated herein by reference.

Description of Related Art

A double-sided cutting insert disclosed in Japanese-Translation of PCT International Application Publication No. 2007-520360 is known. This double-sided cutting insert is a tangential mount type cutting insert. A double-sided cutting insert includes a pair of identical end surfaces, a circumferential side surface extending between the end surfaces, four main cutting edges and a through hole. The circumferential side surface has two identical main side surfaces. The four main cutting edges are formed at intersections between each main side surface and each end surface and are provided at intervals. The through hole extends between the main side surfaces and opens to the main side surface. A fastening screw is inserted into the through hole, and the fastening screw is screwed into an insert pocket of a cutter body. The fastening screw fixes the cutting insert to the cutter body.

In the tangential mount type cutting insert, the fastening screw receives a cutting load from a direction substantially orthogonal to a screw shaft at the time of cutting. In order to secure rigidity of the fastening screw, it is necessary to increase a screw diameter, and an inner diameter of the through hole increases accordingly. However, when the inner diameter of the through hole increases, a thin portion is formed around the through hole of the cutting insert, and the cutting insert is easily fractured. "Fracture" is a phenomenon in which a crack occurs between the outer surface of the cutting insert and the through hole and the cutting insert breaks.

In view of the above circumstances, an object of the present invention is to provide a cutting insert capable of preventing fracturing and an indexable cutting tool using the same.

SUMMARY OF THE INVENTION

An aspect of the cutting insert of the present invention is a cutting insert which includes an insert body having a polygonal plate shape; a pair of polygonal planar first surfaces; a through hole which penetrates the insert body, opens to the pair of first surfaces and extends in a direction of the first axis; a second surface which is disposed on a circumferential surface of the insert body which connects the pair of first surfaces to each other, and faces a direction of a second axis orthogonal to the direction of the first axis; a third surface which is disposed on the circumferential surface, is connected to the pair of the first surfaces and the second surface and faces a direction of a third axis orthogonal to the direction of the first axis and different from the direction of the second axis; and cutting edges having a portion located at an intersection ridge line between the first surface and the second surface and a portion located at an intersection ridge line between the second surface and the third surface. The second surface has a projection part protruding in the direction of the second axis from the second surface, and as viewed from the direction of the second axis, the through hole and the projection part are disposed to overlap each other.

The cutting insert is a tangential mount type cutting insert in which a rake face of a cutting edge is formed on the second surface and a through hole into which the screw member is inserted opens to a pair of first surfaces. In a conventional tangential mount type cutting insert, a portion having a small thickness is easily formed between the through hole and the second surface. However, according to an aspect of the present invention, by providing the projection part on the second surface, it is possible to prevent occurrence of a thin portion around the through hole of the cutting insert. Therefore, it is possible to suppress fracture of the cutting insert.

In the cutting insert, the projection part preferably extends on the second surface in the direction of the first axis. In this case, since the projection part extends in the same direction of the first axis as the through hole, it is possible to further suppress occurrence of a thin portion around the through hole of the cutting insert.

In the cutting insert, as viewed from the direction of the second axis, the projection part is preferably seen inside the through hole in the direction of the third axis. In this case, while suppressing the occurrence of the thin portion around the through hole of the cutting insert, formation of a larger projection part in the direction of the third axis than necessary is prevented, and the material costs for the cutting insert can be prevented.

In the cutting insert, the through hole preferably has a circular cross section perpendicular to the direction of the first axis, and a protruding amount of the projection part from the second surface is preferably a maximum in a portion which overlaps the first axis which is a central axis of the through hole as viewed from the direction of the second axis. In this case, in the portion of the inner circumferential surface of the through hole which is closest to the second surface in the direction of the second axis, the protruding amount of the projection part becomes the maximum. Therefore, it is possible to further suppress fracturing of the cutting insert.

In the cutting insert, the protruding amount of the projection part from the second surface at a position decreases as the position moves away from a portion overlapping the first axis in the direction of the third axis as viewed from the direction of the second axis. In this case, it is possible to suppress the amount of change in wall thickness around the through hole such that it is small, while suppressing the occurrence of the thin portion around the through hole of the cutting insert. Therefore, it is possible to equalize the rigidity around the through hole of the cutting insert.

In the cutting insert, the through hole preferably has a large-diameter section located at an end portion of the insert body in the direction of the first axis, a small-diameter section which has a diameter smaller than the large-diameter section and is located further inwards in the insert in the direction of the first axis than the large-diameter section, and a tapered section which connects the large-diameter section and the small-diameter section and has an inner diameter decreasing toward the inner side of the insert in the direction of the first axis, and as viewed from the direction of the second axis, the projection part has a portion overlapping at least the large-diameter section. In this case, as viewed from the direction of the second axis, the projection part is disposed on a position which overlaps at least the large-diameter section of the through hole. Therefore, it is possible to further suppress the fracture of the cutting insert.

In the cutting insert, the projection part preferably has at least one of a portion overlapping the small-diameter section and a portion overlapping the tapered section as viewed from the direction of the second axis, and a protruding amount of a portion of the projection part overlapping the large-diameter section from the second surface toward the direction of the second axis is preferably greater than a protruding amount of a portion overlapping the small-diameter section from the second surface toward the direction of the second axis, and a protruding amount of a portion overlapping the tapered section from the second surface toward the direction of the second axis.

In a conventional cutting insert, the wall thickness between the inner circumferential surface of the through hole and the second surface is liable to be thinner in the portion overlapping the large-diameter section than the portion overlapping the small-diameter section and the portion overlapping the tapered section as viewed from the direction of the second axis.

According to the above configuration of an embodiment of the present invention, since the protruding amount of the projection part is larger in the portion overlapping the larger-diameter section than in the portion overlapping the smaller-diameter section and the portion overlapping the tapered section, the thickness around the through hole can be made uniform, and it is possible to further suppress the fracture of the cutting insert.

In the cutting insert, the second surface preferably has a pair of planar portions located on both sides of the projection part in the direction of the third axis. In this case, the flat surface portion of the second surface can be seated on the insert mounting seat of the tool body. The projection part is provided on one planar portion disposed further away from the cutting edge used for the cutting process than the projection part, among the pair of planar portions. Thus, it is difficult for the chips to come into contact with the planar portion. That is, since chips flowing from the cutting edge to the other planar portion among the pair of planar portions hit the projection part, the projection part discharges the chips in a direction away from the second surface. Thus, the chips are suppressed from coming into contact with one planar portion. Therefore, wear of one planar portion can be suppressed, and the planar portion is stably supported by the insert mounting seat. This makes it possible to stabilize the mounting posture of the cutting insert with respect to the insert mounting seat.

In the cutting insert, in the cross section perpendicular to the direction of the first axis, the through hole preferably has a circular shape, and the outer surface of the projection part has preferably a circular arc shape centered on the first axis being a central axis of the through hole. In this case, the wall thickness between the inner circumferential surface of the through hole and the outer surface of the projection part can be made constant in the cross-sectional view perpendicular to the direction of the first axis, and the fracture of the cutting insert can be further suppressed.

In the cutting insert, the second surface preferably has a land protruding from the second surface in the direction of the second axis and extending along the cutting edge, and an end of the projection part in the direction of the first axis is preferably connected to the land. In this case, since the projection part is connected to the land, the rigidity of the projection part can be enhanced, and the aforementioned operational effect of the projection part can be further enhanced.

In the cutting insert, the insert body may have a quadrangular plate shape.

In the cutting insert, the insert body preferably has a front and back reversibly symmetrical shape. In this case, the cutting insert is a tangential double-sided type. Therefore, the number of cutting edges is doubled and the tool life is prolonged as compared with the tangential single-sided type cutting insert.

An aspect of the present invention is an indexable cutting tool which includes a tool body to be rotated about a tool axis, and a cutting insert mounted on the tool body, wherein the tool body has an insert mounting seat which is disposed on an outer circumference of a front end of the tool body and to which the cutting insert is detachably mounted, and the insert mounting seat has a first wall portion which faces an outer side in a tool radial direction and comes into contact with the first surface, and a second wall portion which faces a tool rotation direction and comes into contact with the second surface, and the second wall portion has a support part which supports a portion of the second surface other than the projection part, and a recess in which the projection part is disposed.

In an aspect of the indexable cutting tool of the present invention, the portion other than the projection part of the second surface of the cutting insert is supported on the support part of the second wall portion of the insert mounting seat facing the tool rotation direction. The projection part of the second surface of the cutting insert is inserted into the recess of the second wall portion of the insert mounting seat. Therefore, while providing the above-described operational effect using the projection part of the cutting insert, by providing the projection part, the problem of shaking of the second surface with respect to the insert mounting seat can be suppressed. The mounting posture of the cutting insert with respect to the insert mounting seat is stabilized.

According to an aspect of the present invention, there is provided a cutting insert and an indexable cutting tool capable of suppressing fracture.

DETAILED DESCRIPTION OF THE INVENTION

An indexable cutting tool 1 and a cutting insert 3 according to an embodiment of the present invention will be described with reference to the drawings.

[Indexable Cutting Tool]

The indexable cutting tool 1 of the present embodiment is an indexable milling cutter having a tangential mount type cutting insert 3. The indexable cutting tool 1 performs a cutting process such as facing cutting or shoulder cutting on a workpiece made of metal or the like.

Figure 1:
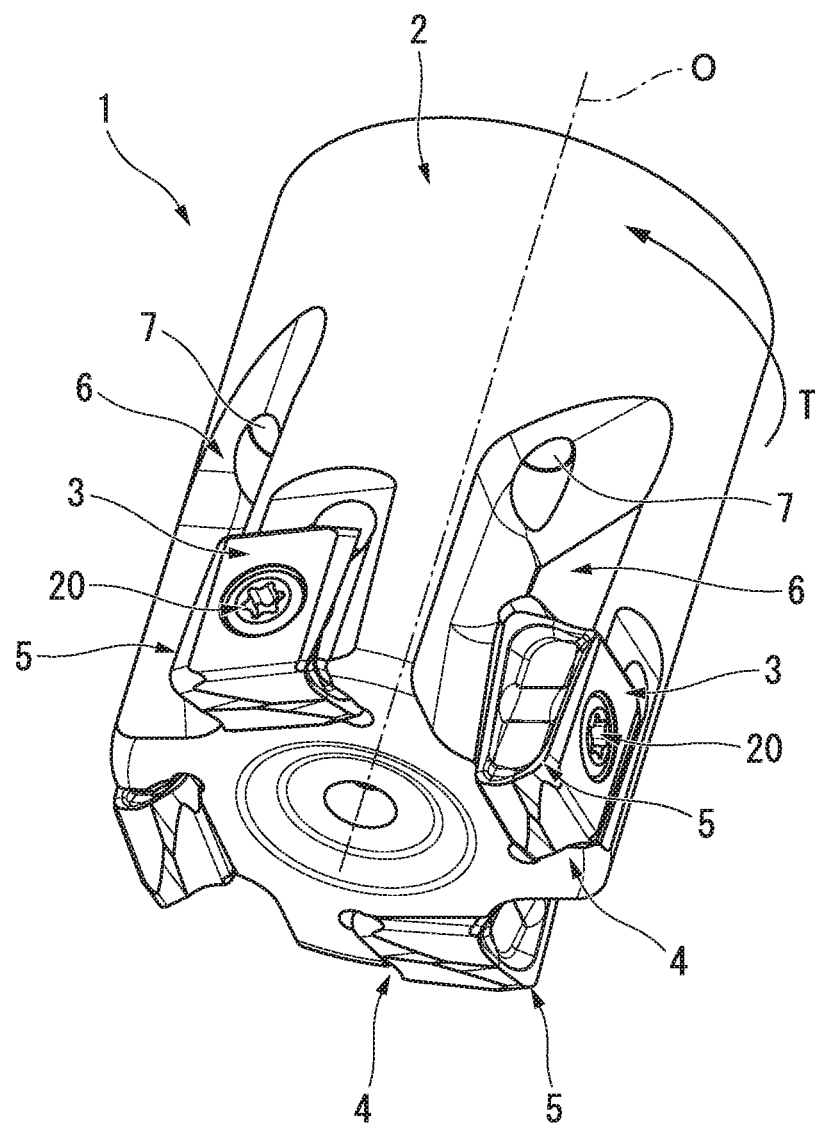
FIG. 1 is a perspective view of an indexable cutting tool according to an embodiment of the present invention.
Figure 2:
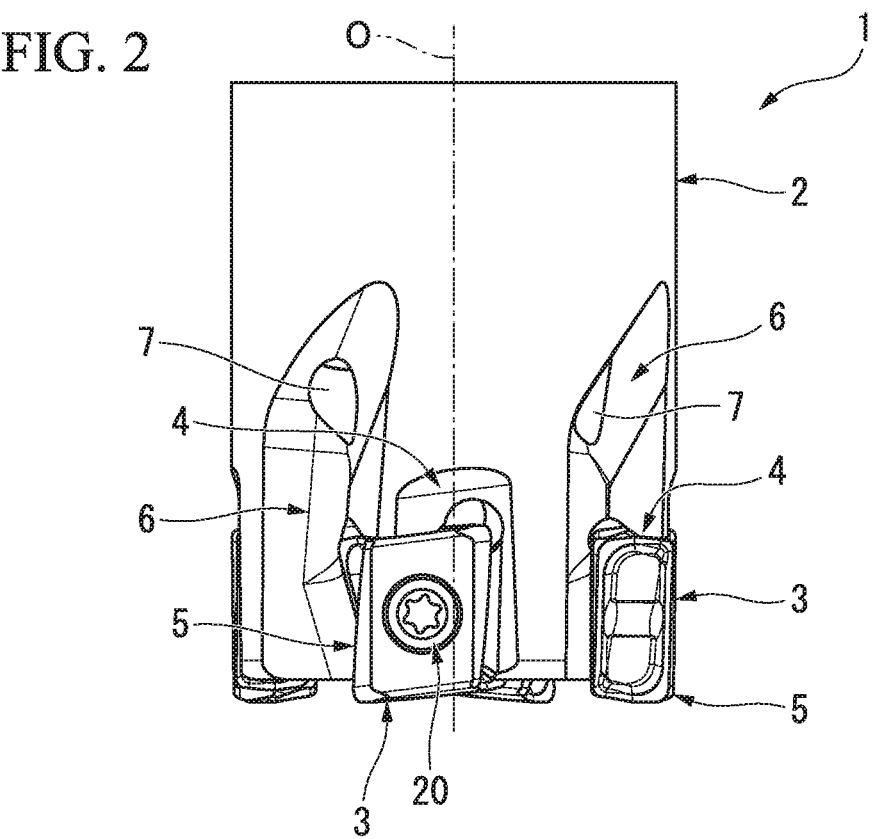
FIG. 2 is a side view of the indexable cutting tool.
Figure 3:
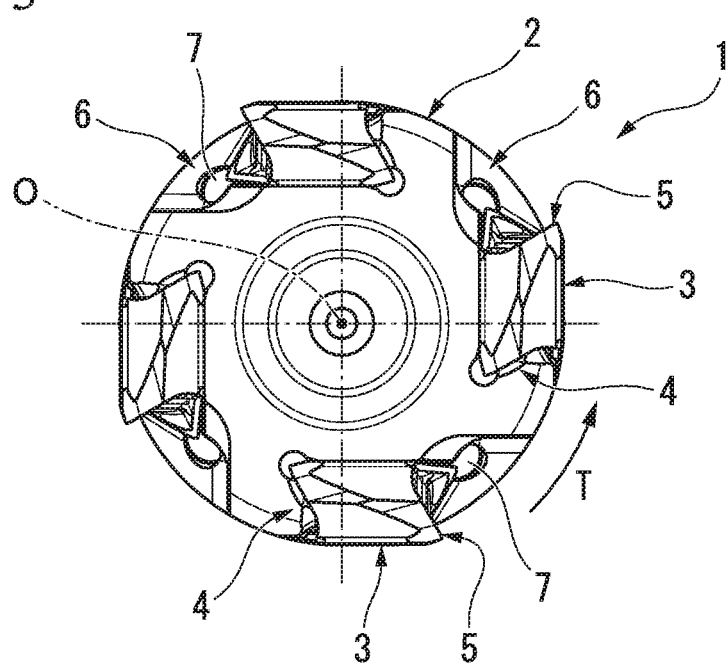
FIG. 3 is a front view of the indexable cutting tool.

As illustrated in FIGS. 1 to 3, the indexable cutting tool 1 includes a tool body 2, a cutting insert 3, and a screw member 20. The tool body 2 rotates around a tool axis O. The tool axis O is a central axis of the tool body 2. The cutting insert 3 is mounted on the tool body 2. The screw member 20 fixes the cutting insert 3 to the tool body 2.

The tool body 2 is detachably mounted on a main shaft or the like of a machine tool (not illustrated). A first end portion (one end portion) of both end portions of the tool body 2 in a direction of the tool axis O is held on the main shaft of the machine tool or the like. The cutting insert 3 is disposed on a second end portion (the other end portion) different from the first end portion among both end portions of the tool body 2 in the direction of the tool axis O.

[Definition of Direction (Orientation) used in this Embodiment (Explanation 1)]

In this embodiment, a direction parallel to the tool axis O of the tool body 2 (a direction along the tool axis O) is referred to as a direction of the tool axis O. In the direction of the tool axis O, a direction (downward in FIG. 2) from the first end portion to the second end portion of the tool body 2 is referred to as toward a tool front end side, and a direction (an upper side in FIG. 2) from the second end portion to the first end portion is referred to as a tool rear end side.

A direction orthogonal to the tool axis O is referred to as a tool radial direction. In the tool radial direction, a direction of approach to the tool axis O is referred to as inwards in the tool radial direction, and a direction away from the tool axis O is referred to as an outer side in the tool radial direction.

A direction of circumferentially turning around the tool axis O is referred to as a tool circumferential direction. In the circumferential direction of the tool, a direction in which the tool body 2 rotates at the time of cutting is referred to as a tool rotation direction T, and an opposite rotation direction thereto is referred to as a direction opposite to the tool rotation direction T (a tool counter-rotation direction).

The definition of the direction related to the cutting insert 3 will be described later.

[Tool Body]

The tool body 2 is made of, for example, a metal such as a steel material. The tool body 2 has a columnar shape or a cylindrical shape. As illustrated in FIGS. 1 to 6, in this embodiment, the tool body 2 has a columnar shape or a cylindrical shape. The tool body 2 may have a disc shape. The tool body 2 has an insert mounting seat 4, a chip pocket 6, and a coolant hole 7.

[Insert Mounting Seat (Explanation 1)]

The insert mounting seat 4 is disposed on an outer circumference of the front end of the tool body 2. The insert mounting seat 4 is recessed from the outer circumferential surface of the tool body 2 toward the inner side in the tool radial direction. The insert mounting seat 4 is recessed from the front end surface of the tool body 2 toward the tool rear end side. The insert mounting seat 4 has a polygonal hole shape. In this embodiment, the insert mounting seat 4 has a rectangular hole shape. A plurality of insert mounting seats 4 are provided in the tool body 2. The plurality of insert mounting seats 4 are spaced apart from each other in the circumferential direction of the tool.

A cutting insert 3 is detachably mounted on the insert mounting seat 4. The cutting insert 3 mounted on the insert mounting seat 4 causes at least a portion of the cutting edge 5 (a main cutting edge 14 to be described later) to protrude outward from the outer circumferential surface of the tool body 2 in the tool radial direction. The cutting insert 3 mounted on the insert mounting seat 4 causes at least a portion of the cutting edge 5 (an auxiliary cutting edge 15 to be described later) to protrude from the front end surface of the tool body 2 to the tool front end side.

Other components of the insert mounting seat 4 will be described later separately.

[Chip Pocket]

The chip pocket 6 is disposed on the outer circumference of the front end of the tool body 2. The chip pocket 6 is recessed from the outer circumferential surface of the tool body 2 toward the inner side in the tool radial direction. A depth at which the chip pocket 6 is recessed from the outer circumferential surface of the tool body 2 toward the inner side in the tool radial direction is greater than a depth at which the insert mounting seat 4 is recessed from the outer circumferential surface of the tool body 2 toward the inner side in the tool radial direction. The chip pocket 6 is recessed from the front end surface of the tool body 2 toward the tool rear end side. A depth at which the chip pocket 6 is recessed from the front end surface of the tool body 2 toward the tool rear end side is greater than a depth at which the insert mounting seat 4 is recessed from the front end surface of the tool body 2 toward the tool rear end side.

A plurality of chip pockets 6 are provided in the tool body 2. The plurality of chip pockets 6 are disposed at intervals in the tool circumferential direction. The chip pocket 6 is disposed adjacent to the insert mounting seat 4 in the tool rotation direction T. An end portion of the insert mounting seat 4 in the tool rotation direction T is connected to an end portion on the tool front end side of the chip pocket 6. The inside of the insert mounting seat 4 and the inside of the chip pocket 6 communicate with each other.

[Coolant Hole]

The coolant hole 7 extends inside the tool body 2. In the present embodiment, the coolant hole 7 extends inside the tool body 2 in the direction of the tool axis O. The coolant hole 7 penetrates the tool body 2. An end portion of the coolant hole 7 on the tool rear end side is connected to the main shaft of the machine tool or the like. An end portion of the coolant hole 7 on the tool front end side opens to the chip pocket 6. The coolant hole 7 opens toward the cutting edge 5 of the cutting insert 3 mounted on the insert mounting seat 4. Coolant (cutting fluid, air, etc.) is supplied to the coolant hole 7 through the main shaft of the machine tool and the like.

[Cutting Insert]

The cutting insert 3 is made of cemented carbide containing, for example, tungsten carbide and cobalt as components. As illustrated in FIGS. 7 to 10, the cutting insert 3 includes an insert body 10 having a polygonal plate shape, a pair of polygonal planar first surfaces 11, a through hole 16, a second surface 12, a third surface 13, and a cutting edge 5. The through hole 16 penetrates the insert body 10 and opens to the pair of first surfaces 11.

[Insert Body (Explanation 1)]

The insert body 10 has a pair of first surfaces 11 and a circumferential surface on the outer surface of the insert body 10. The circumferential surface of the insert body 10 connects the pair of first surfaces 11 to each other. The circumferential surface connects the outer circumferential edges of the pair of first surfaces 11. The second surface 12 and the third surface 13 are disposed on the circumferential surface. The second surface 12 and the third surface 13 are arranged in the circumferential direction on the circumferential surface of the insert body 10.

In the present embodiment, the insert body 10 has a quadrangular plate shape, and the pair of first surfaces 11 have a quadrilateral planar shape. Specifically, the insert body 10 has a rectangular plate shape. The insert body 10 has a front and back reversibly symmetrical shape. That is, the cutting insert 3 is a tangential double-sided type cutting insert. Each of a pair of first surfaces 11, a pair of the second surfaces 12, and a pair of the third surfaces 13 are provided on the outer surface of the insert body 10. The circumferential surface of the insert body 10 has four surfaces arranged in the circumferential direction (a direction orbiting around the central axis of the through hole 16). The four surfaces are a pair of second surfaces 12 and a pair of third surfaces 13. The second surfaces 12 and the third surfaces 13 are alternately arranged in the circumferential direction.

Other configurations of the insert body 10 will be described later.

[Definition of Direction (Orientation) used in this Embodiment (Explanation 2)]

In this embodiment, the central axis of the through hole 16 is referred to as a first axis C1. The first axis C1 extends in a thickness direction of the insert body 10. A direction parallel to the first axis C1 (a direction along the first axis C1) is a direction of the first axis C1. The direction of the first axis C1 corresponds to the thickness direction of the insert body 10. The first axis C1 passes through each center of the pair of first surfaces 11.

A second axis C2 passes through the circumferential surface of the insert body 10 and is orthogonal to the first axis C1. The second axis C2 passes through each center of the pair of second surfaces 12. The direction parallel to the second axis C2 (the direction along the second axis C2) is the direction of the second axis C2. The direction of the second axis C2 is a direction orthogonal to the direction of the first axis C1.

A third axis C3 passes through the circumferential surface of the insert body 10 and is orthogonal to the first axis C1. The third axis C3 passes through each center of the pair of third surfaces 13. The direction parallel to the third axis C3 (the direction along the third axis C3) is the direction of the third axis C3. The direction of the third axis C3 is a direction orthogonal to the direction of the first axis C1 and different from the direction of the second axis C2. In this embodiment, the insert body 10 has a rectangular plate shape, and the third axis C3 and the second axis C2 are orthogonal to each other. Therefore, the direction of the third axis C3 is also a direction orthogonal to the direction of the second axis C2.

The first axis C1 and the second axis C2 intersect each other at a predetermined point inside the insert body 10. The first axis C1 and the third axis C3 intersect each other at a predetermined point inside the insert body 10. The second axis C2 and the third axis C3 intersect each other at a predetermined point inside the insert body 10. The predetermined point is a center (center point) of the insert body 10. The three axes of the first axis C1, the second axis C2, and the third axis C3 intersect (are orthogonal to) each other at the center of the insert body 10.

A direction from the first surface 11 toward the center of the insert body 10 in the direction of the first axis C1 is referred to as an insert inner side in the direction of the first axis C1, and a direction from the center of the insert body 10 toward the first surface 11 is referred to as an insert outer side in the direction of the first axis C1.

A direction from the second surface 12 toward the center of the insert body 10 in the direction of the second axis C2 is referred to as an insert inner side in the direction of the second axis C2, and a direction from the center of the insert body 10 toward the second surface 12 is referred to as an insert outer side in the direction of the second axis C2.

A direction from the third surface 13 toward the center of the insert body 10 in the direction of the third axis C3 is referred to as an insert inner side in the direction of the third axis C3, and a direction from the center of the insert body 10 toward the third surface 13 is referred to as an insert outer side in the direction of the third axis C3.

[Insert Body (Explanation 2)]

The insert body 10 has a rotationally symmetrical shape of 180° around the first axis C1. The insert body 10 has a rotationally symmetrical shape of 180° around the second axis C2. The insert body 10 has a rotationally symmetrical shape of 180° around the third axis C3.

The first surface 11 faces the direction of the first axis C1, and the pair of first surfaces 11 are disposed back to back against each other. Each first surface 11 faces outwards from the insert in the direction of the first axis C1. The second surface 12 faces the direction of the second axis C2, and the pair of second surfaces 12 are disposed back to back with each other. Each second surface 12 faces the outside of the insert in the direction of the second axis C2. The third surface 13 faces the direction of the third axis C3, and the pair of third surfaces 13 are disposed back to back with each other. Each third surface 13 faces the outside of the insert in the direction of the third axis C3.

The first surface 11 connects the pair of second surfaces 12 to each other and connects the pair of third surfaces 13 to each other. The second surface 12 connects the pair of first surfaces 11 to each other and connects the pair of third surfaces 13 to each other. The third surface 13 connects the pair of first surfaces 11 to each other and connects the pair of second surfaces 12 to each other.

A distance between the pair of first surfaces 11 in the direction of the first axis C1 is smaller than a distance between the pair of second surfaces 12 in the direction of the second axis C2. A distance between the pair of first surfaces 11 in the direction of the first axis C1 is smaller than a distance between the pair of third surfaces 13 in the direction of the third axis C3. Therefore, the insert body 10 has a plate shape in which the direction of the first axis C1 is the thickness direction (a plate thickness direction). A distance between the pair of second surfaces 12 in the direction of the second axis C2 is smaller than a distance between the pair of third surfaces 13 in the direction of the third axis C3. That is, the distance between the pair of first surfaces 11 in the direction of the first axis C1, the distance between the pair of second surfaces 12 in the direction of the second axis C2, and the distance between the pair of third surfaces 13 in the direction of the third axis C3 increase in this order.

[Cutting Edge]

The cutting edge 5 is disposed on the outer circumferential edge of the second surface 12. The cutting edge 5 is formed at an intersection ridge line portion among the second surface 12, the first surface 11 and the third surface 13. The cutting edge 5 has a portion (a main cutting edge 14 to be described later) located at an intersection ridge line between the portion located the first surface 11 and the second surface 12, and a portion (an auxiliary cutting edge 15 to be described later) located at an intersection ridge line between the second surface 12 and the third surface 13.

As viewed from the direction of the second axis C2, the cutting edge 5 is substantially L-shaped. Two sets of L-shaped cutting edges 5 are provided on the outer circumferential edge of one second surface 12. At the outer circumferential edge of one second surface 12, the two sets of cutting edges 5 are disposed at positions that are 180° rotationally symmetrical with respect to the second axis C2. In this embodiment, a total of four cutting edges 5 are provided in the cutting insert 3.

The cutting edge 5 has a main cutting edge 14, an auxiliary cutting edge 15, a corner cutting edge 21, and a connecting cutting edge 22. A blade length of the main cutting edge 14 is longer than a blade length of the auxiliary cutting edge 15, a blade length of the corner cutting edge 21, and a blade length of the connecting cutting edge 22. The blade length of the auxiliary cutting edge 15 is longer than the blade length of the corner cutting edge 21 and the blade length of the connecting cutting edge 22. The blade length of the corner cutting edge 21 is longer than the blade length of the connecting cutting edge 22. For example, when the radius of curvature of the corner cutting edge 21 is large, the blade length of the corner cutting edge 21 may be longer than the blade length of the auxiliary cutting edge 15.

The main cutting edge 14 is formed at the intersection ridge line portion between the first surface 11 and the second surface 12. The main cutting edge 14 extends linearly. The main cutting edge 14 is located on a long side of the four sides (a pair of long sides and a pair of short sides) which form the outer circumferential edge of the second surface 12.

Figure 9:
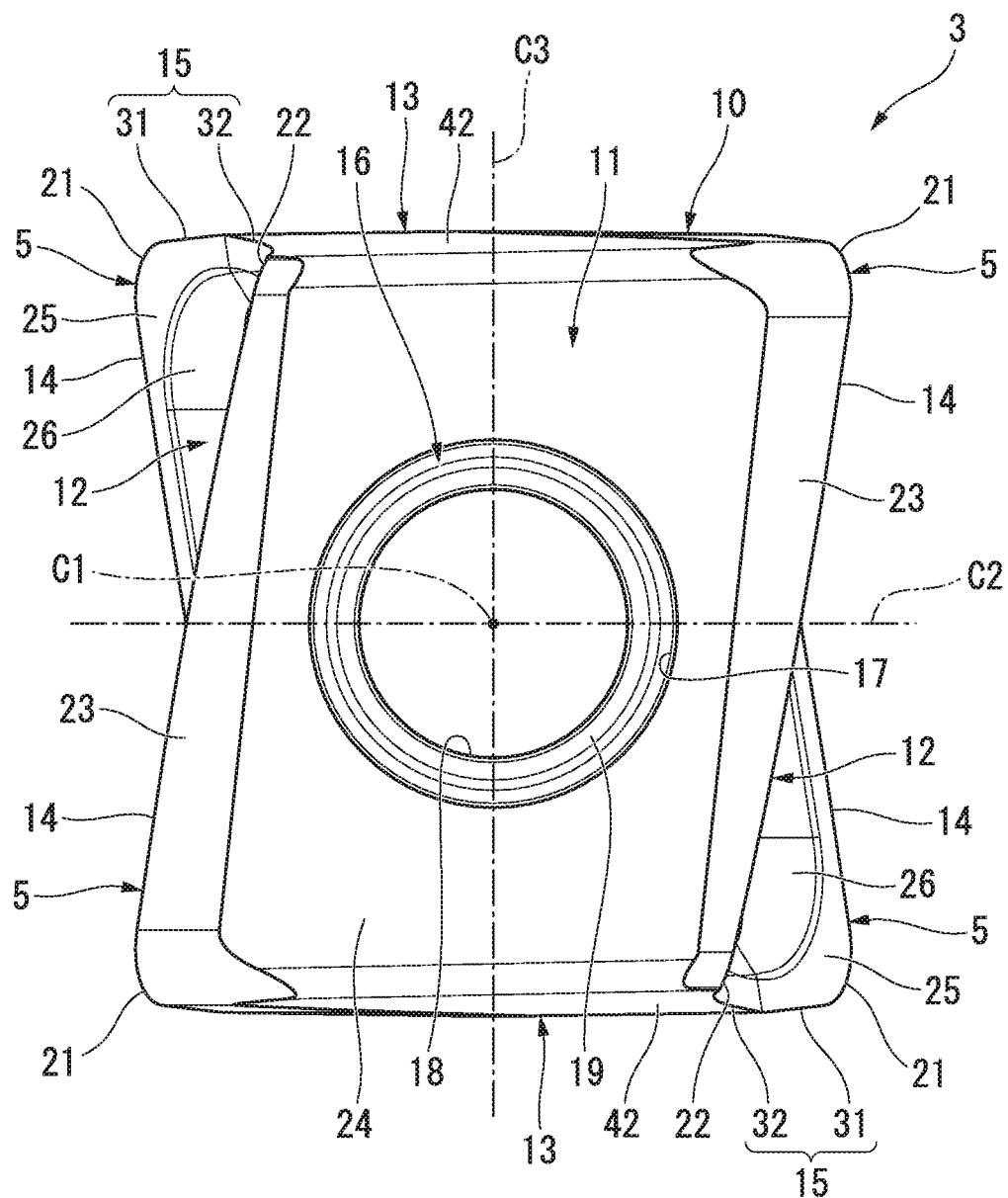
FIG. 9 is a diagram of the cutting insert as viewed from a direction of the first axis (a diagram of a first surface as viewed from the front).

As illustrated in FIG. 9, in the main cutting edge 14, an end portion among both end portions of the main cutting edge 14 connected to the corner cutting edge 21 is disposed on the outermost side of the insert in the direction of the second axis C2. The main cutting edge 14 extends obliquely toward the inside of the insert in the direction of the second axis C2, as the main cutting edge 14 is directed in the direction of the third axis C3 from the end portion connected to the corner cutting edge 21 among both end portions of the main cutting edge 14 to the end portion (the end portion connected to the connecting cutting edge 22 of the other cutting edge 5) different from the end portion connected to the corner cutting edge 21.

Figure 8:
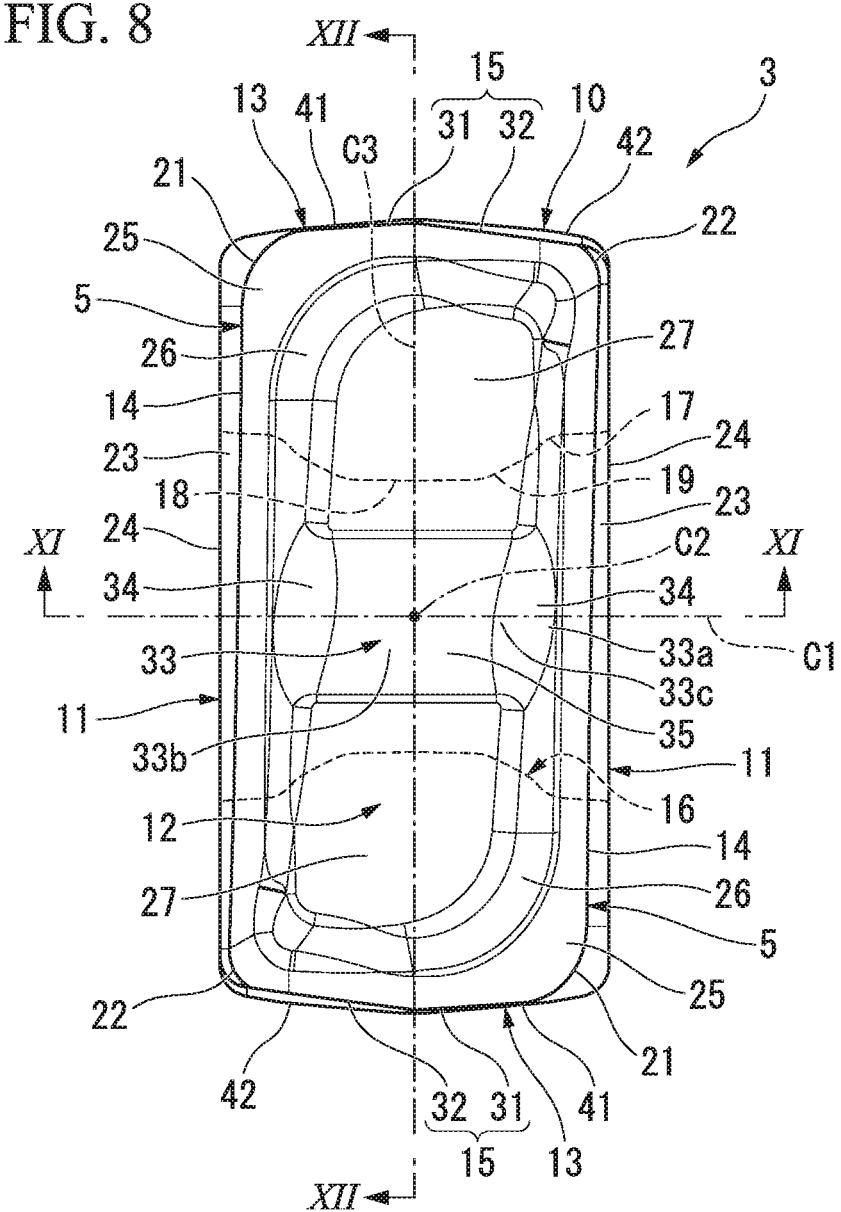
FIG. 8 is a diagram of the cutting insert as viewed from a direction of the second axis (a diagram of a second surface viewed from the front).

As illustrated in FIG. 8, in the main cutting edge 14, an end portion among both end portions of the main cutting edge 14 connected to the corner cutting edge 21 is disposed on the innermost side of the insert in the direction of the first axis C1. The main cutting edge 14 extends obliquely toward the outside of the insert in the direction of the first axis C1, when the main cutting edge 14 is directed in the direction of the third axis C3 from the end portion connected to the corner cutting edge 21 among both end portions of the main cutting edge 14 to the end portion (the end portion connected to the connecting cutting edge 22 of the other cutting edge 5) different from the end portion connected to the corner cutting edge 21.

The auxiliary cutting edge 15 is formed at the intersection ridge line portion between the second surface 12 and the third surface 13. The auxiliary cutting edge 15 is located on the short side of the four sides (a pair of long sides and a pair of short sides) which form the outer circumferential edge of the second surface 12. As illustrated in FIG. 8, when the cutting insert 3 is viewed from the direction of the second axis C2 (when the second surface 12 is viewed from the front), the auxiliary cutting edge 15 has a V shape which protrudes toward the outer side of the insert in the direction of the third axis C3.

The auxiliary cutting edge 15 has a first auxiliary cutting edge 31 and a second auxiliary cutting edge 32.

Figure 10:
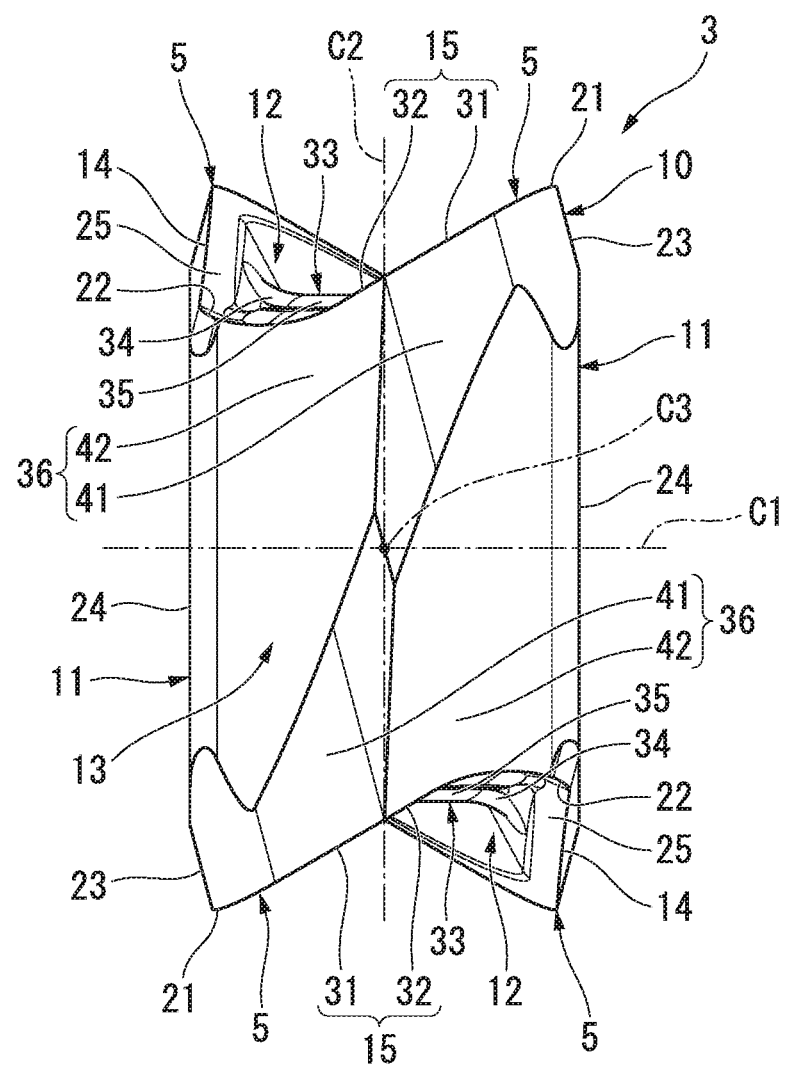
FIG. 10 is a diagram of the cutting insert as viewed from a direction of the third axis (a diagram of a third surface viewed from the front).

As illustrated in FIGS. 9 and 10, the first auxiliary cutting edge 31 extends linearly. The first auxiliary cutting edge 31 functions as a flat blade at the time of a cutting process. Specifically, when the cutting insert 3 is mounted on the insert mounting seat 4 of the tool body 2, the first auxiliary cutting edge 31 extends on a virtual plane (not illustrated) perpendicular to the tool axis O. The first auxiliary cutting edge 31 has an end portion connected to the corner cutting edge 21 and an end portion connected to the second auxiliary cutting edge 32.

As illustrated in FIG. 8, when the cutting insert 3 is viewed in the direction of the second axis C2, in the first auxiliary cutting edge 31, an end portion among both end portions of the first auxiliary cutting edge 31 connected to the corner cutting edge 21 is disposed on the innermost side of the insert in the direction of the third axis C3. The first auxiliary cutting edge 31 extends obliquely toward the outside of the insert in the direction of the third axis C3, as the first auxiliary cutting edge 31 is directed in the direction of the first axis C1 from the end portion connected to the corner cutting edge 21 among both end portions of the first auxiliary cutting edge 31 to the end portion (the end portion connected to the second auxiliary cutting edge 32) different from the end portion connected to the corner cutting edge 21.

As illustrated in FIG. 10, when the cutting insert 3 is viewed from the direction of the third axis C3 (when the third surface 13 is viewed from the front), in the first auxiliary cutting edge 31, the end portion connected to the corner cutting edge 21 among both end portions of the first auxiliary cutting edge 31 is disposed on the outermost side of the insert in the direction of the second axis C2. The first auxiliary cutting edge 31 extends obliquely toward the inside of the insert in the direction of the second axis C2, as the first auxiliary cutting edge 31 is directed in the direction of the first axis C1 from the end portion connected to the corner cutting edge 21 among both end portions of the first auxiliary cutting edge 31 to the end portion (the end portion connected to the second auxiliary cutting edge 32) different from the end portion connected to the corner cutting edge 21.

As illustrated in FIGS. 9 and 10, the second auxiliary cutting edge 32 extends in a concave curve shape. The second auxiliary cutting edge 32 functions as a ramping blade at the time of cutting process. Specifically, when the cutting insert 3 is mounted on the insert mounting seat 4 of the tool body 2, the second auxiliary cutting edge 32 extends obliquely toward the tool rear end side, as the second auxiliary cutting edge 32 is directed from the connecting portion with the first auxiliary cutting edge 31 to the inner side in the tool radial direction. The second auxiliary cutting edge 32 has an end portion connected to the first auxiliary cutting edge 31 and an end portion connected to the connecting cutting edge 22.

As illustrated in FIG. 8, when the cutting insert 3 is viewed in the direction of the second axis C2, in the second auxiliary cutting edge 32, the end portion connected to the first auxiliary cutting edge 31 among both end portions of the second auxiliary cutting edge 32 is disposed on the outermost side of the insert in the direction of the third axis C3. The second auxiliary cutting edge 32 extends obliquely toward the inside of the insert in the direction of the third axis C3, as the second auxiliary cutting edge 32 is directed in the direction of the first axis C1 from the end portion connected to the first auxiliary cutting edge 31 among both end portions of the second auxiliary cutting edge 32 to the end portion (the end portion connected to the connecting cutting edge 22) different from the end portion connected to the first auxiliary cutting edge 31.

As illustrated in FIG. 10, when the cutting insert 3 is viewed in the direction of the third axis C3, in the second auxiliary cutting edge 32, the end portion connected to the first auxiliary cutting edge 31 among both end portions of the second auxiliary cutting edge 32 is disposed on the outermost side of the insert in the direction of the second axis C2. The second auxiliary cutting edge 32 extends obliquely toward the inside of the insert in the direction of the second axis C2, as the second auxiliary cutting edge 32 is directed in the direction of the first axis C1 from the end portion connected to the first auxiliary cutting edge 31 among both end portions of the second auxiliary cutting edge 32 to the end portion (the end portion connected to the connecting cutting edge 22) different from the end portion connected to the first auxiliary cutting edge 31.

The second auxiliary cutting edge 32 has a portion located at the innermost side of the insert in the direction of the second axis C2 in the cutting edge 5. The portion of the second auxiliary cutting edge 32 located at the innermost side of the insert in the direction of the second axis C2 is located between both end portions of the second auxiliary cutting edge 32.

A connecting portion of the auxiliary cutting edge 15 between the first auxiliary cutting edge 31 and the second auxiliary cutting edge 32 is located on an virtual plane (not illustrated) passing through the center of the cutting insert 3 and perpendicular to the first axis C1. That is, the connecting portion of the auxiliary cutting edge 15 between the first auxiliary cutting edge 31 and the second auxiliary cutting edge 32 is disposed on the center of the cutting insert 3 in the thickness direction (direction of the first axis C1).

As illustrated in FIG. 8, when the cutting insert 3 is viewed from the direction of the second axis C2, the connecting portion between the first auxiliary cutting edge 31 and the second auxiliary cutting edge 32 is located on the outermost side of the insert in the direction of the third axis C3 in the cutting edge 5.

As illustrated in FIGS. 8 and 9, the corner cutting edge 21 extends in a convex curve shape. The corner cutting edge 21 is disposed on a corner portion located between the main cutting edge 14 and the first auxiliary cutting edge 31 among the four corner portions of the outer circumferential edge of the second surface 12, and is connected to the main cutting edge 14 and the first auxiliary cutting edge 31. The corner cutting edge 21 is in contact with the main cutting edge 14 and the first auxiliary cutting edge 31, and smoothly connects the main cutting edge 14 and the first auxiliary cutting edge 31.

As illustrated in FIGS. 9 and 10, the corner cutting edge 21 has a portion located on the outermost side of the insert in the direction of the second axis C2 in the cutting edge 5.

As illustrated in FIG. 8, the connecting cutting edge 22 extends in a convex curve shape. The connecting cutting edge 22 is disposed on a corner portion located between the second auxiliary cutting edge 32 and the main cutting edge 14 of the other cutting edge 5 different from one cutting edge 5 including the second auxiliary cutting edge 32 among the four corner portions of the outer circumferential edge of the second surface 12, and is connected to the second auxiliary cutting edge 32 and the main cutting edge 14 of the other cutting edge 5. The connecting cutting edge 22 connects a pair of cutting edges 5 adjacent to each other around the second axis C2 at the outer circumferential edge of the second surface 12. Since the connecting cutting edge 22 is a portion of the apparent cutting edge 5 which is not generally used for cutting, the connecting cutting edge 22 may not be provided on the cutting edge 5.

[First Surface]

The first surface 11 is a plate surface facing the thickness direction of the plate-like cutting insert 3. The first surface 11 has a rectangular shape. As illustrated in FIG. 9, the first surface 11 has a parallelogram shape when the cutting insert 3 is viewed from the direction of the first axis C1 (when the first surface 11 is viewed as a front face). A length of the first surface 11 in the direction of the third axis C3 is larger than a length of the direction of the second axis C2. The first surface 11 has a flank face (a main flank face 23 to be described later) of the main cutting edge 14 in the rake face of the cutting edge 5.

The first surface 11 has a main flank face 23 and a radial seating surface portion 24.

Figure 11:
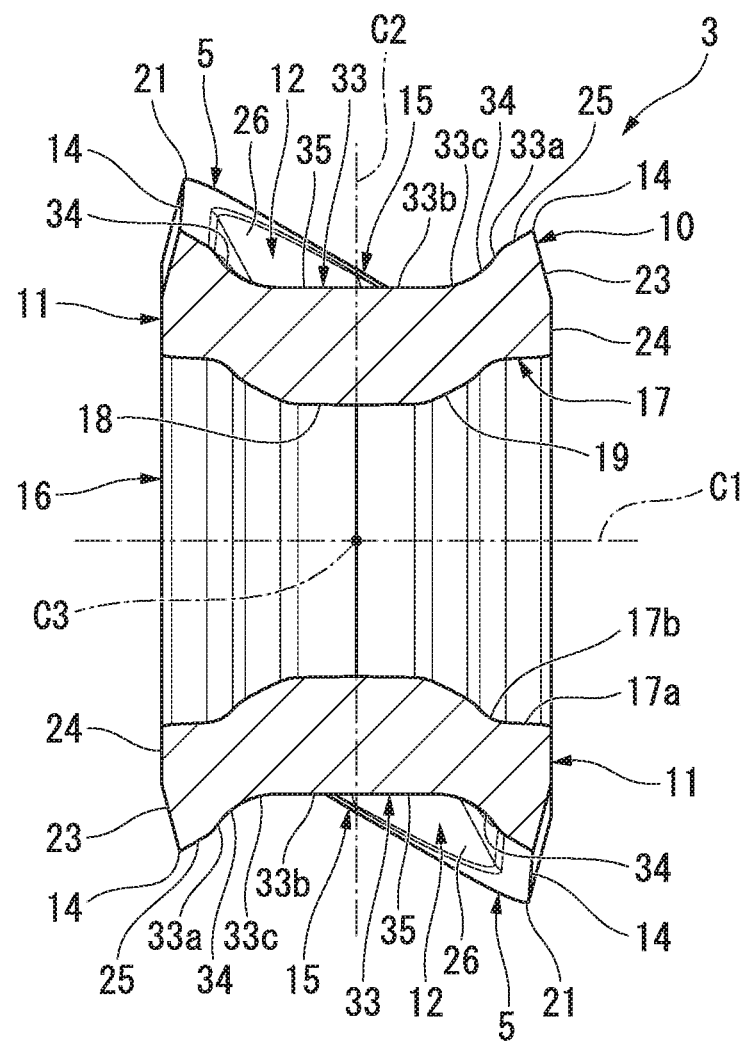
FIG. 11 is a cross-sectional view taken along the line XI-XI of FIG. 8.

The main flank face 23 extends along the main cutting edge 14. The main flank face 23 is connected to the main cutting edge 14. The main flank face 23 is located inside the main cutting edge 14 on the first surface 11. A pair of the main flank faces 23 is provided at both end portions of the first surface 11 in the direction of the second axis C2. The width of the main flank face 23 is the maximum at the connecting portion between the main cutting edge 14 and the corner cutting edge 21. The width of the main flank face 23 decreases from the connecting portion between the main cutting edge 14 and the corner cutting edge 21 toward the connecting portion between the main cutting edge 14 and the connecting cutting edge 22 of the other cutting edge 5. As illustrated in FIG. 10 and FIG. 11, the main flank face 23 is inclined toward the outside of the insert in the direction of the first axis C1 as it goes away from the main cutting edge 14 in the direction of the second axis C2.

The radial seating surface portion 24 has a planar shape perpendicular to the first axis C1. The radial seating surface portion 24 is located between the pair of main flank faces 23 on the first surface 11. The main flank face 23 may not be provided on the first surface 11. In this case, the radial seating surface portion 24 is directly connected to the main cutting edge 14.

[Through Hole]

Figure 12:
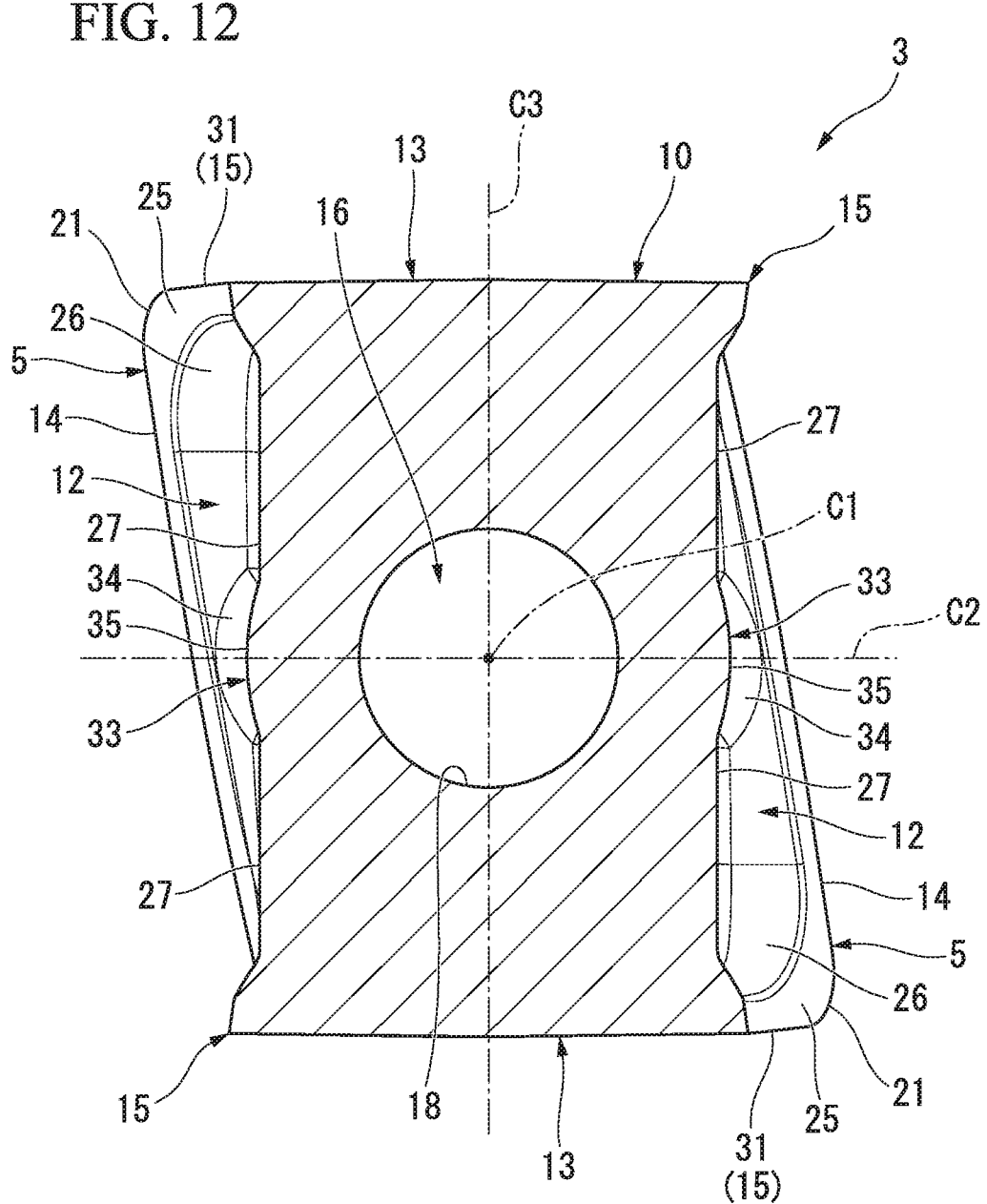
FIG. 12 is a cross-sectional view taken along line XII-XII of FIG. 8.

The through hole 16 extends in the direction of the first axis C1 inside the insert body 10. The through hole 16 penetrates the cutting insert 3 in the direction of the first axis C1 and opens to the respective radial seating surface portions 24 of the pair of first surfaces 11. A screw member 20 is inserted into the through hole 16 (see FIG. 1 etc.). As illustrated in FIG. 12, the through hole 16 has a circular cross section perpendicular to the first axis C1.

As illustrated in FIG. 11, the through hole 16 has a large-diameter section 17, a small-diameter section 18, and a tapered section 19. The large-diameter section 17 is located at the end portion of the insert body 10 in the direction of the first axis C1. A pair of large-diameter sections 17 are provided at both end portions of the through hole 16 in the direction of the first axis C1. The large-diameter section 17 opens to the first surface 11.

The large-diameter section 17 has an outer large-diameter section 17a and an inner large-diameter section 17b. The outer large-diameter section 17a is connected to the radial seating surface portion 24. As illustrated in FIG. 11, in a cross-sectional view perpendicular to the third axis C3, the outer large-diameter section 17a extends substantially linearly. In this embodiment, the inner diameter of the outer large-diameter section 17a decreases from the radial seating surface portion 24 toward the inside of the insert in the direction of the first axis C1. The inner diameter of the outer large-diameter section 17a may be constant in the direction of the first axis C1.

The inner large-diameter section 17b is located on the inner side of the insert in the direction of the first axis C1 than the outer large-diameter section 17a. In the cross-sectional view illustrated in FIG. 11, the inner large-diameter section 17b extends in a concave curve shape. The inner large-diameter section 17b decreases in diameter from the connecting portion between the inner large-diameter section 17b and the outer large-diameter section 17a toward the inside of the insert in the direction of the first axis C1. That is, as the inner large-diameter section 17b moves away from the connecting portion between the inner large-diameter section 17b and the outer large-diameter section 17a in the direction of the first axis C1, the inner large-diameter section 17b obliquely extends toward the inside of the insert in the direction of the second axis C2 and toward the inside of the insert in the direction of the third axis C3. The inner diameter of the inner large-diameter section 17b decreases toward the inside of the insert in the direction of the first axis C1.

The small-diameter section 18 has a smaller diameter than the large-diameter section 17. The small-diameter section 18 has the smallest diameter in the through hole 16. The small-diameter section 18 is located on the inner side of the insert in the direction of the first axis C1 than the large-diameter section 17. The small-diameter section 18 is disposed away from the large-diameter section 17 to the inside of the insert in the direction of the first axis C1. The inner diameter of the small-diameter section 18 is substantially constant in the direction of the first axis C1. The inner diameter of the small-diameter section 18 slightly increases from the center of the insert body 10 (the intersection of the first axis C1, the second axis C2, and the third axis C3) toward the outer side of the insert in the direction of the first axis C1. The inner diameter of the small-diameter section 18 may be constant in the direction of the first axis C1. The center of the insert body 10 is located inside the small-diameter section 18. The inner circumferential surface of the small-diameter section 18 intersects the second axis C2 and the third axis C3.

The tapered section 19 connects the large-diameter section 17 and the small-diameter section 18. A pair of the tapered section 19 is provided between the pair of large-diameter sections 17 and the small-diameter section 18. The tapered section 19 is located on the inner side of the insert in the direction of the first axis C1 than the large-diameter section 17. The tapered section 19 is located on the outer side of the insert in the direction of the first axis C1 than the small-diameter section 18. The tapered section 19 decreases in diameter from the connecting portion between the tapered section 19 and the large-diameter section 17 toward the inside of the insert in the direction of the first axis C1. The inner diameter of the tapered section 19 decreases toward the inside of the insert in the direction of the first axis C1.

[Second Surface]

Figure 7:
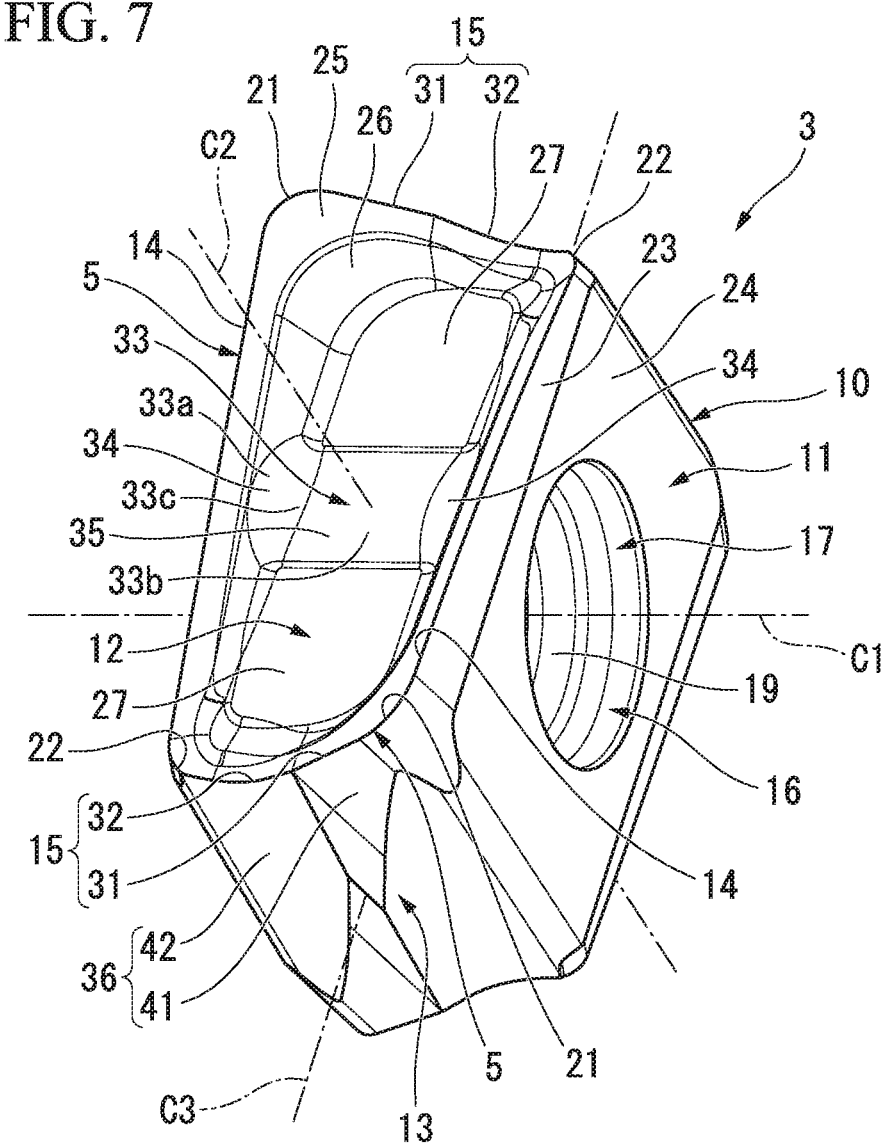
FIG. 7 is a perspective view of a cutting insert according to an embodiment of the present invention.

As illustrated in FIG. 7, the second surface 12 is connected to the first surface 11. The second surface 12 is connected to the pair of first surfaces 11. The second surface 12 is connected to the long side of four sides (a pair of long sides and a pair of short sides) which form the outer circumferential edge of the first surface 11. The second surface 12 has a rectangular shape. As illustrated in FIG. 8, the second surface 12 has a rectangular shape as viewed from the direction of the second axis C2. The length of the second surface 12 in the direction of the third axis C3 is larger than the length of the second surface 12 in the direction of the first axis C1. The second surface 12 has a rake face of the cutting edge 5. The rake face of the cutting edge 5 has a rake face of the main cutting edge 14, a rake face of the auxiliary cutting edge 15, a rake face of the corner cutting edge 21 and a rake face of the connecting cutting edge 22.

The second surface 12 has a land 25, an inclined surface portion 26, a projection part 33, and a planar portion 27. The land 25 protrudes from the second surface 12 in the direction of the second axis C2. The land 25 protrudes to the outermost side of the insert in the direction of the second axis C2 on the second surface 12. The land 25 is disposed inside the cutting edge 5 on the second surface 12. The land 25 extends along the cutting edge 5. The land 25 is connected to the cutting edge 5 from the inside of the second surface 12 with respect to the cutting edge 5 over the entire length of the cutting edge 5.

As illustrated in FIG. 8, as viewed from the direction of the second axis C2, the land 25 is substantially L-shaped. Two sets of L-shaped lands 25 are provided on one second surface 12. The two sets of lands 25 are disposed at positions that are rotationally symmetrical with respect to each other by 180° around the second axis C2. The two pairs of lands 25 are connected to each other around the second axis C2. The entire shape of the two pairs of lands 25 is a rectangular frame shape.

The land 25 is the rake face of the cutting edge 5. The land 25 has a rake face of the main cutting edge 14, a rake face of the auxiliary cutting edge 15, a rake face of the corner cutting edge 21, and a rake face of the connecting cutting edge 22. The rake face of the main cutting edge 14 is located inside the main cutting edge 14 on the second surface 12. The rake face of the auxiliary cutting edge 15 is located inside the auxiliary cutting edge 15 on the second surface 12. The rake face of the corner cutting edge 21 is located inside the corner cutting edge 21 on the second surface 12. The rake face of the connecting cutting edge 22 is located on the inner side of the connecting cutting edge 22 on the second surface 12. When the connecting cutting edge 22 is not used for cutting work, the rake face of the connecting cutting edge 22 may not have a function as a rake face.

The land 25 inclines toward the inside of the insert in the direction of the second axis C2 from the cutting edge 5 toward the inside of the second surface 12. A width of the land 25 (a length in the direction orthogonal to the cutting edge 5) is the maximum at the portion in which the land 25 is connected to the corner cutting edge 21. Among the lands 25, a portion connected to the main cutting edge 14, a portion connected to the corner cutting edge 21 and a portion connected to the first auxiliary cutting edge 31 have a planar shape. A portion of the land 25 connected to the second auxiliary cutting edge 32 and a portion connected to the connecting cutting edge 22 has a concave curved shape.

The inclined surface portion 26 is located on the inner side of the land 25 on the second surface 12. The inclined surface portion 26 is connected to the land 25 from the inner side of the second surface 12. The inclined surface portion 26 extends along the land 25. On the second surface 12 of the inclined surface portion 26, a portion located inside the main cutting edge 14, a portion located inside the corner cutting edge 21, and a portion located inside the first auxiliary cutting edge 31 are inclined toward the inside of the insert in the direction of the second axis C2 from the connecting portion between the inclined surface portion 26 and the land 25 toward the inner side of the second surface 12.

A portion of the inclined surface portion 26 located on the inner side of the main cutting edge 14 on the second surface 12 has an inclination angle with respect to a virtual plane (not illustrated) perpendicular to the second axis C2, which is greater than an inclination angle of a portion of the land 25 located inside the main cutting edge 14 on the second surface 12. A portion of the inclined surface portion 26 located on the inner side of the corner cutting edge 21 on the second surface 12 has at an inclination angle with respect to a virtual plane (not illustrated) perpendicular to the second axis C2, which is greater than an inclination angle of the portion of the land 25 located inside the corner cutting edge 21 on the second surface 12. A portion of the inclined surface portion 26 located on the inner side of the first auxiliary cutting edge 31 on the second surface 12 has an inclination angle with respect to a virtual plane (not illustrated) perpendicular to the second axis C2, which is greater than an inclination angle of the portion of the land 25 located on the inner side of the first auxiliary cutting edge 31 on the second surface 12.

The projection part 33 protrudes from the second surface 12 in the direction of the second axis C2. In this embodiment, the projection part 33 protrudes in the direction of the second axis C2 from a portion (a planar portion 27 to be described later) located on the innermost side of the insert on the second surface 12 in the direction of the second axis C2.

As illustrated in FIG. 8, the through hole 16 and the projection part 33 are disposed to overlap each other as viewed from the direction of the second axis C2. The projection part 33 has a portion that overlaps at least the large-diameter section 17 as viewed from the direction of the second axis C2. The projection part 33 has a portion that overlaps at least the inner large-diameter section 17b of the large-diameter section 17. In this embodiment, the projection part 33 overlaps the large-diameter section 17, the small-diameter section 18 and the tapered section 19 as viewed from the direction of the second axis C2.

As viewed from the direction of the second axis C2, the projection part 33 is seen inside the through hole 16 in the direction of the third axis C3. That is, as viewed from the direction of the second axis C2, both ends of the projection part 33 in the direction of the third axis C3 are located on the inner side of the insert in the direction of the third axis C3 than both ends of the through hole 16 in the direction of the third axis C3. As viewed from the direction of the second axis C2, the projection part 33 is seen inside the through hole 16. A length (width) of the projection part 33 in the direction of the third axis C3 is smaller than a length of the through hole 16 in the direction of the third axis C3.

The projection part 33 extends on the second surface 12 in the direction of the first axis C1. A length of the projection part 33 in the direction of the first axis C1 is larger than a length of the projection part 33 in the direction of the third axis C3. An end of the projection part 33 in the direction of the first axis C1 is connected to the land 25. In the present embodiment, both end portions of the projection part 33 in the direction of the first axis C1 are connected to the pair of lands 25. An end of the projection part 33 in the direction of the first axis C1 is connected to the inclined surface portion 26. In the present embodiment, each of both end portions of the projection part 33 in the direction of the first axis C1 is connected to the inclined surface portion 26.

As illustrated in FIG. 8, as viewed from the direction of the second axis C2, a protruding amount from the second surface 12 is the maximum at the portion in which the projection part 33 overlaps the first axis C1. As viewed from the direction of the second axis C2, a portion of the projection part 33 located on the first axis C1 maximally protrudes from the planar portion 27 to be described later in the direction of the second axis C2.

As viewed from the direction of the second axis C2, as a measuring point is away from the portion overlapping the first axis C1 in the direction of the third axis C3, the protruding amount of the projection part 33 from the second surface 12 at the measuring point decreases (see FIG. 12). That is, as viewed from the direction of the second axis C2, the projection part 33 extends obliquely toward the inside of the insert in the direction of the second axis C2 from the top of the first axis C1 to the direction of the third axis C3.

As illustrated in FIG. 12, in a cross section perpendicular to the direction of the first axis C1, the through hole 16 has a circular shape, and the outer surface of the projection part 33 has a circular arc shape centered on the first axis C1 which is the central axis of the through hole 16. That is, in the cross-sectional view, the projection part 33 has a circular arc shape that is convex toward the outer side of the insert in the direction of the second axis C2.

The projection part 33 has an outer portion 34 and an inner portion 35. A pair of outer portions 34 are provided at both end portions of the projection part 33 in the direction of the first axis C1. The outer portion 34 is located at the end of the projection part 33 in the direction of the first axis C1. As viewed from the direction of the second axis C2, the outer portion 34 overlaps the large-diameter section 17 and the tapered section 19. The outer portion 34 of the projection part 33 is a portion that overlaps at least the large-diameter section 17 as viewed from the direction of the second axis C2.

The outer portion 34 is connected to the land 25. As illustrated in FIG. 11, the outer portion 34 extends obliquely toward the inside of the insert in the direction of the second axis C2 as the outer portion 34 goes away from the connecting portion between the outer portion 34 and the land 25 in the direction of the first axis C1. The protruding amount protruding from (the planar portion 27 of) the second surface 12 of the outer portion 34 in the direction of the second axis C2 is the maximum at the connecting portion between the outer portion 34 and the land 25, and decreases from the connecting portion toward the inside of the insert in the direction to the first axis C1.

As viewed from the direction of the second axis C2, as the outer portion 34 is away from the portion overlapping the first axis C1 in the direction of the third axis C3, the protruding amount from the second surface 12 decreases (see FIG. 12). That is, as viewed from the direction of the second axis C2, the outer portion 34 extends obliquely toward the inside of the insert in the direction of the second axis C2 as the outer portion 34 goes from the top of the first axis C1 toward the direction of the third axis C3.

The inner portion 35 is located between both end portions of the projection part 33 in the direction of the first axis C1. The inner portion 35 connects the pair of outer portions 34 to each other. As viewed from the direction of the second axis C2, the inner portion 35 is disposed to overlap the small-diameter section 18 and the tapered section 19. The inner portion 35 of the projection part 33 is a portion that overlaps at least the small-diameter section 18 as viewed from the direction of the second axis C2. That is, as viewed from the direction of the second axis C2, the projection part 33 has a portion that overlaps the small-diameter section 18.

The protruding amount from (the planar portion 27 of) the second surface 12 of the inner portion 35 in the direction of the second axis C2 is constant in the direction of the first axis C1. As illustrated in FIG. 11, the protruding amount of the outer portion 34 from the second surface 12 in the direction of the second axis C2 of the projection part 33 is smaller than the protruding amount from the second surface 12 in the direction of the second axis C2 of the inner portion 35.

As illustrated in FIG. 8, the inner portion 35 extends on the second surface 12 in the direction of the first axis C1. The length (width) of the inner portion 35 in the direction of the third axis C3 is constant in the direction of the first axis C1. The length of the outer portion 34 in the direction of the third axis C3 in the projection part 33 is larger than the length of the inner portion 35 in the direction of the third axis C3.

As viewed from the direction of the second axis C2, the protruding amount of the inner portion 35 from the second surface 12 decreases as the inner portion 35 is away from the portion overlapping the first axis C1 in the direction of the third axis C3 (see FIG. 12). That is, as viewed from the direction of the second axis C2, the inner portion 35 extends obliquely toward the inside of the insert in the direction of the second axis C2 from the top of the first axis C1 in the direction of the third axis C3.

More specifically, as illustrated in FIG. 8, as viewed from the direction of the second axis C2, the projection part 33 has a portion 33a overlapping the large-diameter section 17, a portion 303b overlapping the small-diameter section 18, and a portion 33c overlapping the tapered section 19. The portion 33a overlapping the large-diameter section 17 is disposed in the outer portion 34. The portion 33b overlapping the small-diameter section 18 is disposed in the inner portion 35. The portion 33c overlapping the tapered section 19 includes a portion located in the outer portion 34 and a portion located in the inner portion 35. That is, the portion 33c overlapping the tapered section 19 is disposed over the outer portion 34 and the inner portion 35.

As illustrated in FIG. 11, the protruding amount of the portion 33a of the projection part 33 overlapping the large-diameter section 17 from the second surface 12 in the direction of the second axis C2 is greater than the protruding amount of the portion 33b overlapping the small-diameter section 18 from the second surface 12 in the direction of the second axis C2, and the protruding amount of the portion 33c overlapping the tapered section 19 from the second surface 12 in the direction of the second axis C2. The length of the portion 33c of the projection part 33 in the direction of the third axis C3 overlapping the tapered section 19 as viewed from the direction of the second axis C2 is larger than the length of the portion 33b overlapping the small-diameter section 18 in the direction of the third axis C3.

The planar portions 27 are located on both sides of the projection part 33 in the direction of the third axis C3 on the second surface 12. In the present embodiment, a pair of planar portions 27 are provided on both sides of the projection part 33 on the second surface 12. The planar portion 27 has a substantially quadrangular shape. In the present embodiment, the planar portion 27 spreads in a direction perpendicular to the second axis C2.

[Third Surface]

As illustrated in FIG. 7, the third surface 13 is connected to the first surface 11 and the second surface 12. The third surface 13 is connected to the pair of first surfaces 11 and the pair of second surfaces 12. The third surface 13 is connected to the short side among the four sides (a pair of long sides and short sides) which form the outer circumferential edge of the first surface 11. The third surface 13 is connected to the short side among the four sides which form the outer circumferential edge of the second surface 12. The third surface 13 has a rectangular shape. As illustrated in FIG. 10, as viewed from the direction of the third axis C3, the third surface 13 has a parallelogram shape. The length of the third surface 13 in the direction of the second axis C2 is larger than the length the direction of the first axis C1. The third surface 13 has a flank face (an auxiliary flank face 36 to be described later) of the auxiliary cutting edge 15 in the flank surface of the cutting edge 5.

The third surface 13 has an auxiliary flank face 36. A pair of the auxiliary flank face 36 is provided on one third surface 13. The pair of auxiliary flank faces 36 face each other in the direction of the second axis C2. The pair of auxiliary flank faces 36 are connected to each other in the direction of the second axis C2.

The auxiliary flank face 36 has a first auxiliary flank face 41 and a second auxiliary flank face 42. The first auxiliary flank face 41 is connected to the first auxiliary cutting edge 31. The first auxiliary flank face 41 is located on the inner side of the first auxiliary cutting edge 31 on the third surface 13. The first auxiliary flank face 41 has a convex curved surface shape. The first auxiliary flank face 41 may have a planar shape. The first auxiliary flank face 41 extends in the direction of the second axis C2 from the first auxiliary cutting edge 31. The length (width) of the first auxiliary flank face 41 in the direction of the first axis C1 decreases toward the inside of the insert in the direction of the second axis C2.

The second auxiliary flank face 42 is connected to the second auxiliary cutting edge 32. The second auxiliary flank face 42 is located on the inner side of the second auxiliary cutting edge 32 on the third surface 13. The second auxiliary flank face 42 has a planar shape. The second auxiliary flank face 42 extends in the direction of the second axis C2 from the second auxiliary cutting edge 32. The length (width) of the second auxiliary flank face 42 in the direction of the first axis C1 decreases as going away from the second auxiliary cutting edge 32 in the direction of the second axis C2.

The first auxiliary flank face 41 and the second auxiliary flank face 42 of the auxiliary flank face 36 are connected to each other in the direction of the first axis C1. As illustrated in FIG. 8, the second auxiliary flank face 42 is inclined toward the inside of the insert in the direction of the third axis C3 from the connecting portion between the second auxiliary flank face 42 and the first auxiliary flank face 41 toward the direction of the first axis C1 (toward the outer side of the insert). That is, as illustrated in FIG. 8, as viewed from the direction of the second axis C2, as the second auxiliary flank face 42 is away from the third axis C3 in the direction of the first axis C1, the second auxiliary flank face 42 extends toward the inside of the insert in the direction of the third axis C3.

As illustrated in FIG. 10, the length of the second auxiliary flank face 42 in the direction of the second axis C2 is larger than the length of the first auxiliary flank face 41 in the direction of the second axis C2. The length (width) of the second auxiliary flank face 42 in the direction of the first axis C1 is larger than the length of the first auxiliary flank face 41 in the direction of the first axis C1.

[Insert Mounting Seat (Explanation 2)]

Figure 4:
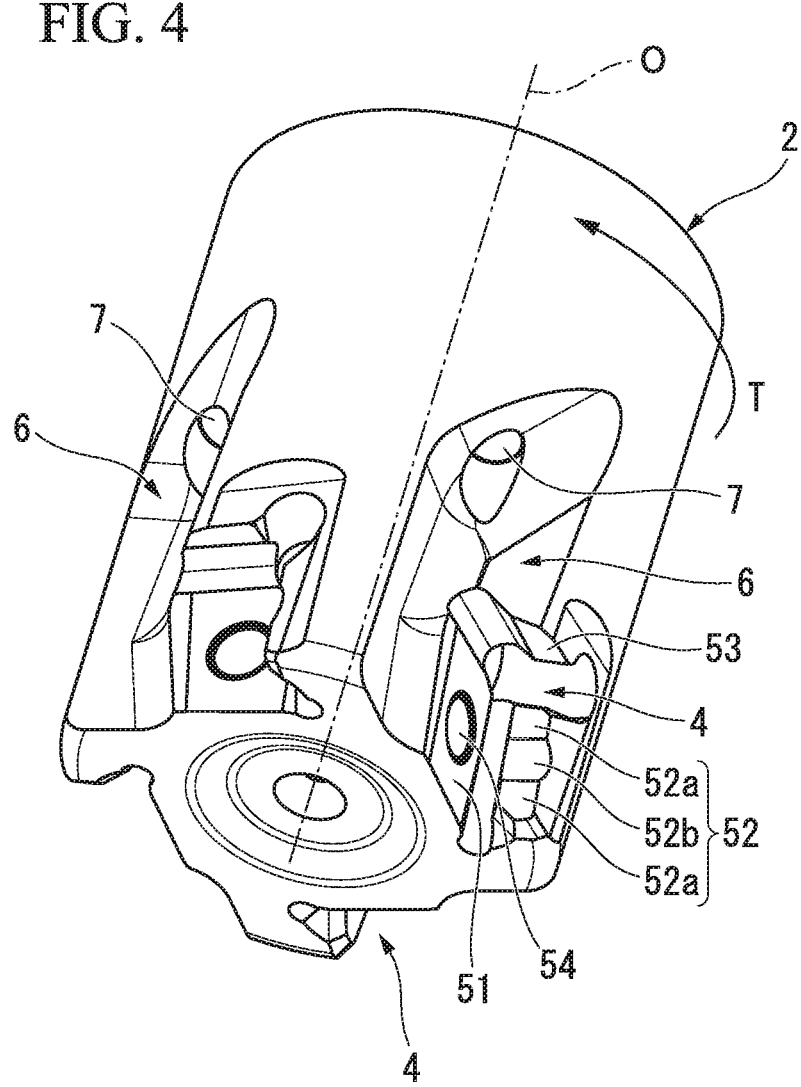
FIG. 4 is a perspective view of a tool body.
Figure 5:
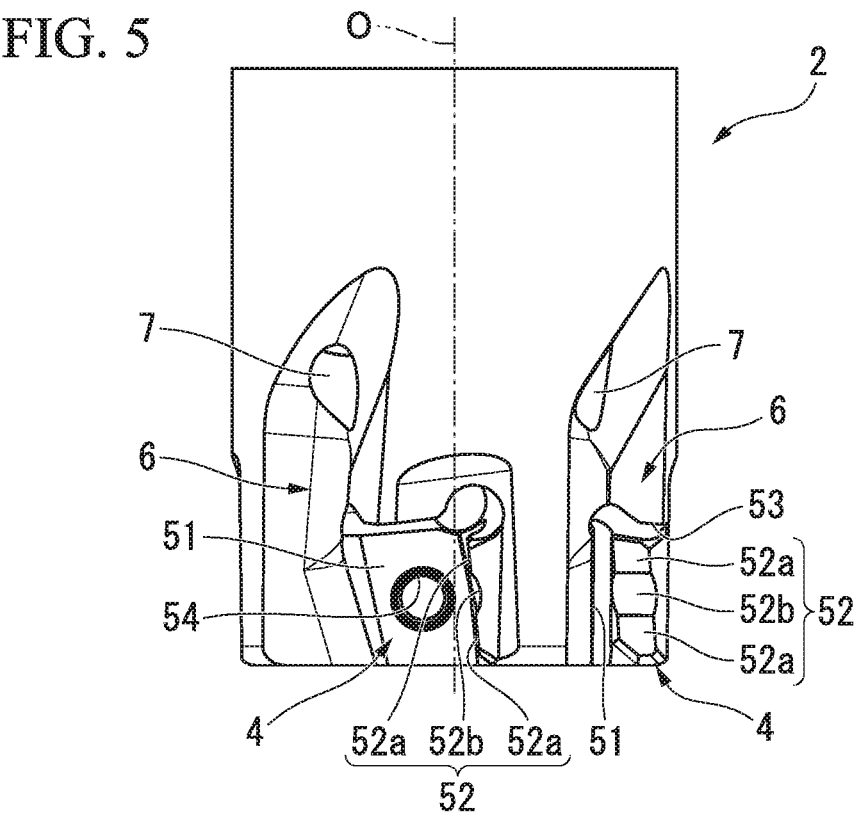
FIG. 5 is a side view of the tool body.
Figure 6:
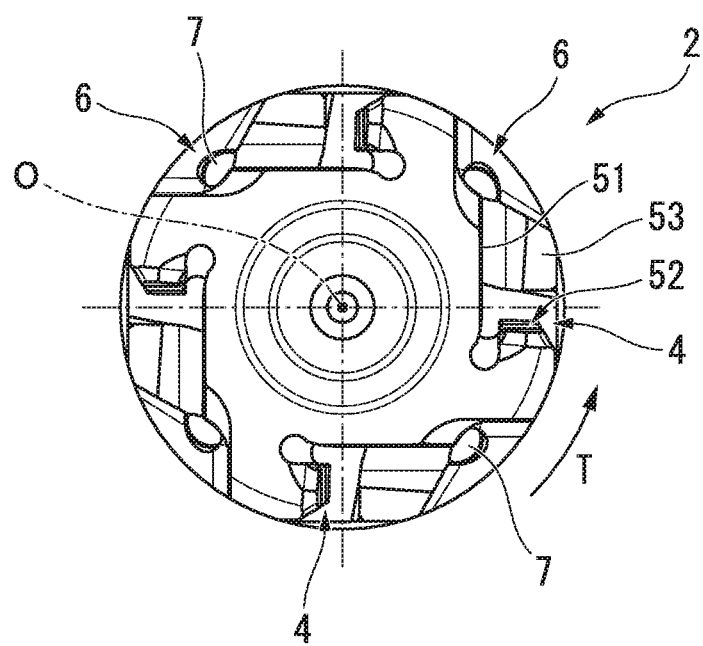
FIG. 6 is a front view of the tool body.

As illustrated in FIGS. 4 to 6, the insert mounting seat 4 has a first wall portion 51, a second wall portion 52, a third wall portion 53, and a screw hole 54. The first wall portion 51 faces the outer side in the tool radial direction at the insert mounting seat 4. The first wall portion 51 is has a planar shape. The first wall portion 51 has a substantially rectangular shape. When the cutting insert 3 is mounted on the insert mounting seat 4, the first wall portion 51 comes into contact with the first surface 11. The first wall portion 51 comes into contact with the radial seating surface portion 24 of the first surface 11.

The second wall portion 52 faces the tool rotation direction T at the insert mounting seat 4. When the cutting insert 3 is mounted on the insert mounting seat 4, the second wall portion 52 comes into contact with the second surface 12.

The second wall portion 52 has a support part 52a and a recess 52b. The support part 52a has a planar shape. The support part 52a has a substantially quadrilateral shape or a substantially pentagonal shape. A pair of support parts 52a are provided on the second wall portion 52 at intervals in the direction of the tool axis O. The support part 52a supports a portion of the second surface 12 other than the projection part 33. In the present embodiment, the support part 52a supports the planar portion 27. The pair of support parts 52a of the second wall portion 52 come into contact with the pair of planar portions 27 of the second surface 12.

The recess 52b is recessed from the second wall portion 52 in a direction opposite to the tool rotation direction T. The recess 52b is recessed toward a counter tool rotation direction beyond the support part 52a. The recess 52b has a groove shape extending in the tool radial direction. The projection part 33 is inserted into the recess 52b. A projection part 33 is disposed in the recess 52b. The inner surface of the recess 52b and the outer surface of the projection part 33 face each other with an interval.

The third wall portion 53 faces the tool front end side at the insert mounting seat 4. The third wall portion 53 has a planar shape. The third wall portion 53 has a substantially pentagonal shape. When the cutting insert 3 is mounted on the insert mounting seat 4, the third wall portion 53 comes into contact with the third surface 13. The third wall portion 53 comes into contact with the second auxiliary flank face 42 of the third surface 13. The third wall portion 53 comes into contact with the second auxiliary flank face 42 located outside in the tool radial direction, among the pair of second auxiliary flank faces 42 of the third surface 13.

The screw hole 54 opens to the first wall portion 51. The screw hole 54 extends from the first wall portion 51 to the inner side in the tool radial direction. A female screw portion is provided on the inner circumferential surface of the screw hole 54.

[Screw Member]

As illustrated in FIGS. 1 and 2, the screw member 20 fixes the cutting insert 3 to the insert mounting seat 4. The screw member 20 is inserted into the through hole 16 and is screwed into the insert mounting seat 4.

The screw member 20 has a screw shaft and a screw head. The screw shaft is inserted into the through hole 16. A male screw is provided on the outer circumferential surface of the screw shaft. The screw shaft is screwed into the screw hole 54. A diameter (outer diameter) of the screw head is larger than a diameter of the screw shaft. At least a part of the screw head is inserted into the through hole 16. The screw head comes into contact with the inner circumferential surface of the through hole 16. Although not specifically illustrated, the screw head comes into contact with the tapered section 19.

[Mounting Attitude of Cutting Insert to Insert Mounting Seat]

When the cutting insert 3 is mounted on the insert mounting seat 4, although not specifically illustrated, the second axis C2 of the cutting insert 3 extends obliquely toward the tool front end side toward the tool rotation direction T. The third axis C3 extends obliquely in a direction opposite to the tool rotation direction T toward the tool front end side.

[Operational Effects of the Present Embodiment]

According to the cutting insert 3 and the indexable cutting tool 1 using the same of the present embodiment, the following operational effects can be obtained.

The cutting insert 3 is a tangential mount type cutting insert in which the rake face of the cutting edge 5 is formed on the second surface 12 and the through hole 16 into which the screw member 20 is inserted opens to the pair of first surfaces 11. In the conventional tangential mount type cutting insert, a portion having a small thickness is easily formed between the through hole 16 and the second surface 12. However, in the present embodiment, by providing the projection part 33 on the second surface 12, it is possible to suppress the occurrence of a thin portion around the through hole 16 of the cutting insert 3. Therefore, it is possible to suppress the fracture of the cutting insert 3.

In the present embodiment, since the projection part 33 extends on the second surface 12 in the same direction as the through hole 16 in the direction of the first axis C1, it is possible to further suppress occurrence of a thin portion around the through hole 16 of the cutting insert 3.

As illustrated in FIG. 8, as viewed from the direction of the second axis C2, the projection part 33 is seen inside the through hole 16 in the direction of the third axis C3. Therefore, while suppressing the occurrence of a thin portion around the through hole 16 of the cutting insert 3, the formation of the projection part 33 in the direction of the third axis C3 to be greater than necessary is suppressed, and the material cost of the cutting insert 3 is suppressed.

As illustrated in FIG. 12, the cross section of the through hole 16 has a circular shape, and the projection part 33 has a maximum protruding amount from the second surface 12 in a portion overlapping the first axis C1 as viewed in the direction of the second axis C2. That is, in the portion of the inner circumferential surface of the through hole 16 that is closest to the second surface 12 in the direction of the second axis C2, the protruding amount of the projection part 33 is the maximum. Therefore, it is possible to further suppress the fracture of the cutting insert 3.

Further, in the present embodiment, the protruding amount of the projection part 33 from the second surface 12 decreases as going away from portion overlapping the first axis C1 in the direction of the third axis C3 as viewed from the direction of the second axis C2. Therefore, it is possible to suppress the amount of change in the thickness around the through hole 16 to be small, while suppressing the occurrence of a thin portion around the through hole 16 of the cutting insert 3. Therefore, it is possible to equalize the rigidity around the through hole 16 of the cutting insert 3.

Further, in this embodiment, the projection part 33 has a portion overlapping at least the large-diameter section 17 as viewed from the direction of the second axis C2. That is, as viewed from the direction of the second axis C2, the projection part 33 is disposed on a position overlapping at least the large-diameter section 17 of the through hole 16. Therefore, it is possible to further suppress the fracture of the cutting insert 3.

In the conventional cutting insert, the wall thickness between the inner circumferential surface of the through hole 16 and the second surface 12 becomes easily thinner in the portion 33a overlapping the large-diameter section 17 than in the portion 33b overlapping the small-diameter section 18 and the portion 33c overlapping the tapered section 19 as viewed from the direction of the second axis C2. On the contrary, in the present embodiment, in the projection part 33, the protruding amount of the portion 33a (the outer portion 34) overlapping the large-diameter section 17 from the second surface 12 is greater than the protruding amount of the portion 33b (the inner portion 35) overlapping the small-diameter section 18 from the second surface 12 and the protruding amount of the portion 33c overlapping the tapered section 19 from the second surface 12. That is, since the protruding amount of the projection part 33 is greater in the portion 33a overlapping the large-diameter section 17 than in the portion 33b overlapping the small-diameter section 18 and the portion 33c overlapping the tapered section 19, the wall thickness around the through hole 16 can be equalized, and it is possible to further suppress the fracture of the cutting insert 3.

In the present embodiment, in the projection part 33, the length of the portion 33c overlapping the tapered section 19 in the direction of the third axis C3 is larger than the length of the portion 33b overlapping the small-diameter section 18 in the direction of the third axis C3. That is, since the length (width) of the projection part 33 in the direction of the third axis C3 is larger in the portion 33c overlapping the tapered section 19 than in the portion 33b overlapping the small-diameter section 18, it is possible to secure the rigidity of the insert body 10 in the portion 33c which is closer to the cutting edge 5 (particularly the main cutting edge 14 and the corner cutting edge 21) than the portion 33b overlapping the small-diameter section 18 and which overlaps the tapered section 19 on which a large cutting load easily acts.

In the present embodiment, the second surface 12 has a pair of planar portions 27 located on both sides of the projection part 33 in the direction of the third axis C3. Further, the planar portion 27 can be seated on the insert mounting seat 4 of the tool body 2. Since the projection part 33 is provided on one planar portion 27 among the pair of planer portions 27, (among the pair of planar portions 27, the planar portion 27 located on the tool rear end side), which is located farther away from the cutting edge 5 used for cutting than the projection part 33, the chips are hard to come into contact with the planar portion. That is, since chips flowing from the cutting edge 5 to the other planar portion 27 (among the pair of planar portions 27, the planar portion 27 located on the tool front end side) among the pair of planar portions 27 hit the projection part 33, the projection part 33 discharges the chips in a direction away from the second surface 12. Thus, the chips are suppressed from coming into contact with one planar portion 27. Therefore, wear of one planar portion 27 can be suppressed, and the planar portion 27 is stably supported by the insert mounting seat 4. This makes it possible to stabilize the mounting posture of the cutting insert 3 with respect to the insert mounting seat 4.

As illustrated in FIG. 12, in a cross section perpendicular to the direction of the first axis C1, the through hole 16 has a circular shape, and the outer surface of the projection part 33 has a circular arc shape with the first axis C1 as a center. Therefore, the wall thickness between the inner circumferential surface of the through hole 16 and the outer surface of the projection part 33 can be made constant, and the fracture of the cutting insert 3 can be further suppressed.

In the present embodiment, since the end of the projection part 33 in the direction of the first axis C1 is connected to the land 25, the rigidity of the projection part 33 can be enhanced, and the above-described operational effect of the projection part 33 can be further enhanced. Since the end of the projection part 33 in the direction of the first axis C1 is connected to the inclined surface portion 26, the rigidity of the projection part 33 is further enhanced.

In the present embodiment, the insert body 10 has a front and back reversibly symmetrical shape. That is, the cutting insert 3 is a tangential double-sided type. Therefore, the number of the cutting edges 5 is doubled and the tool life is prolonged as compared with a cutting insert of a tangential single-sided type.

In the present embodiment, a portion (in the present embodiment, the planar portion 27) other than the projection part 33 of the second surface 12 of the cutting insert 3 is supported on the support part 52a of the second wall portion 52 of the insert mounting seat 4 facing the tool rotation direction T. The projection part 33 of the second surface 12 of the cutting insert 3 is inserted into the recess 52b of the second wall portion 52 of the insert mounting seat 4. Therefore, while providing the above-described operational effect by the projection part 33 of the cutting insert 3, by providing the projection part 33, the problem of shaking of the second surface 12 with respect to the insert mounting seat 4 can be suppressed. The mounting posture of the cutting insert 3 to the insert mounting seat 4 is stabilized.

[Other Configurations Included in the Present Invention]

The present invention is not limited to the above-described embodiments, and as will be described below, for example, it is possible to change the configuration or the like without departing from the spirit of the present invention.

In the above-described embodiment, the example in which the protruding amount of the projection part 33 protruding from the second surface 12 in the direction of the second axis C2 changes in the direction of the first axis C1 is described, but the present invention is not limited thereto. The protruding amount of the projection part 33 protruding from the second surface 12 may be constant in the direction of the first axis C1.

In the above-described embodiment, the example in which the protruding amount of the projection part 33 protruding from the second surface 12 in the direction of the second axis C2 changes in the direction of the third axis C3 is described, but the present invention is not limited thereto. The protruding amount of the projection part 33 protruding from the second surface 12 may be constant in the direction of the third axis C3.

In the aforementioned embodiment, the example in which the length (width) of the projection part 33 in the direction of the third axis C3 varies in the direction of the first axis C1 as viewed from the direction of the second axis C2 is described, but the present invention is not limited thereto. The length of the projection part 33 in the direction of the third axis C3 may be constant in the direction of the first axis C1.

As viewed from the direction of the second axis C2, the projection part 33 may have a portion located outside the through hole 16 in the direction of the third axis C3.

In the above-described embodiment, the example in which the planar portion 27 has a planar shape spreading in a direction perpendicular to the second axis C2 is described, but the present invention is not limited thereto. The planar portion 27 may have a planar shape that is inclined and spreads with respect to a direction perpendicular to the second axis C2 (a virtual plane perpendicular to the second axis C2).

Figure 13:
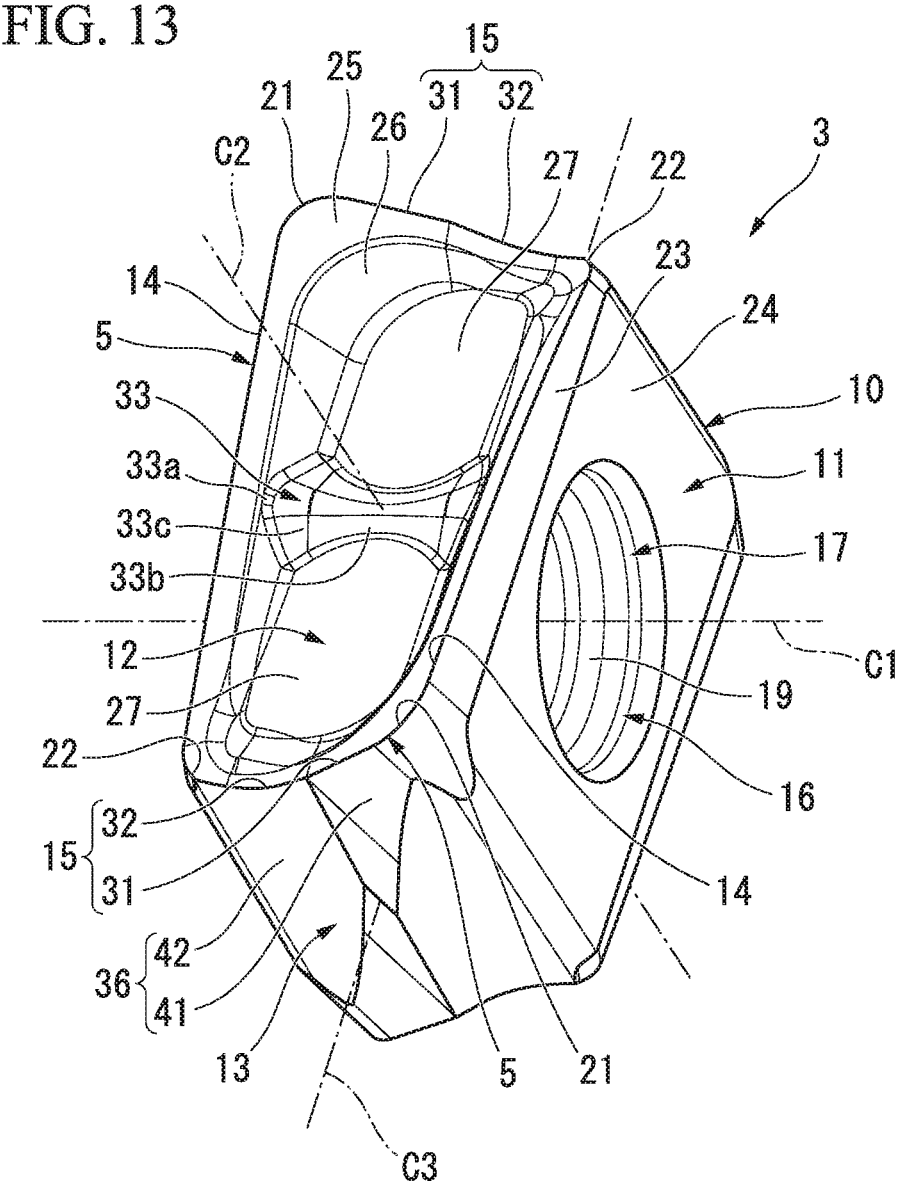
FIG. 13 is a perspective view illustrating a first modified example of the cutting insert.
Figure 14:
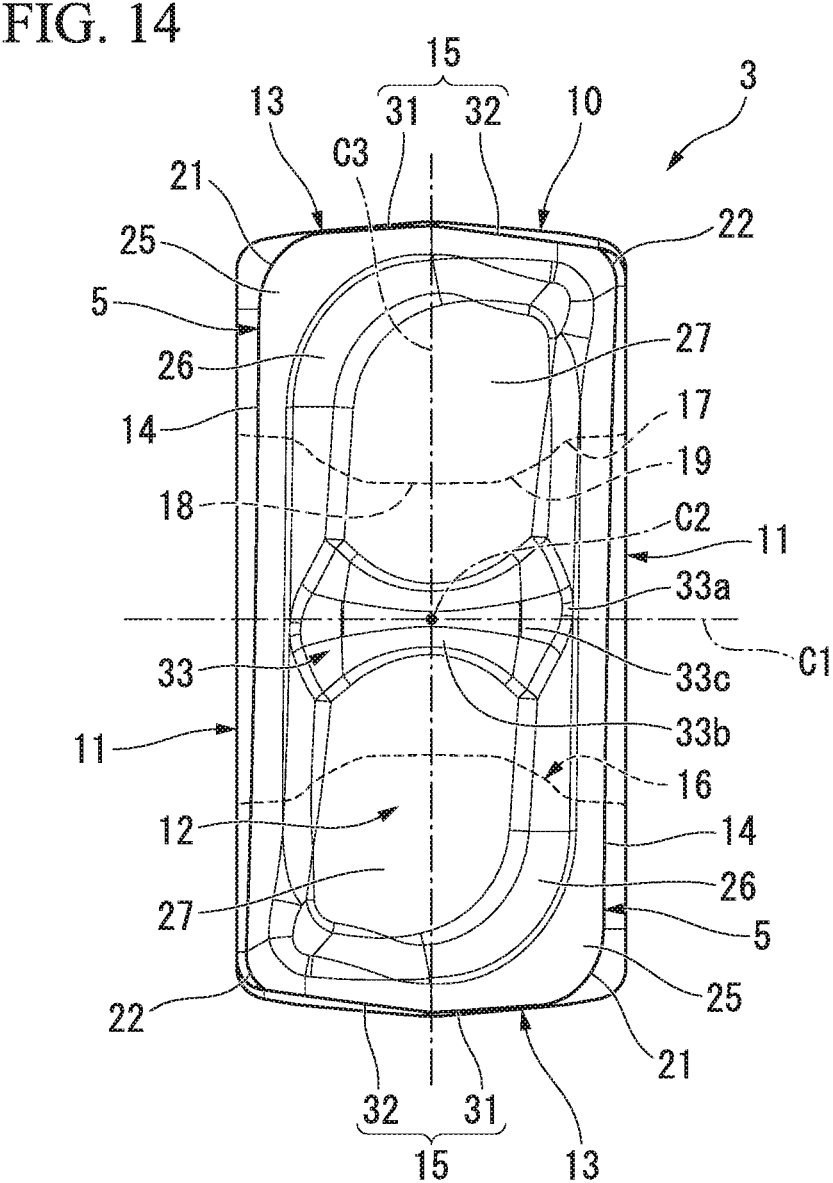
FIG. 14 is a diagram of the cutting insert of FIG. 13 as viewed from the direction of the second axis.

The cutting insert 3 illustrated in FIGS. 13 and 14 is a first modified example of the cutting insert 3 described in the above embodiment.

In the first modified example, as viewed from the direction of the second axis C2, the protruding amount of the projection part 33 from (the planar portion 27 of) the second surface 12 in the direction of the second axis C2 decreases toward the inside of the insert in the direction of the first axis C1. Specifically, the protruding amount of the portion 33a of the projection part 33 overlapping the large-diameter section 17 from the second surface 12 decreases toward the inside of the insert in the direction of the first axis C1. The protruding amount of the portion 33c overlapping the tapered section 19 from the second surface 12 decreases toward the inside of the insert in the direction of the first axis C1. The protruding amount of the portion 33b overlapping the small-diameter section 18 from the second surface 12 decreases toward the inside of the insert in the direction of the first axis C1.

As viewed from the direction of the second axis C2, the length (width) of the portion 33b of the projection part 33 overlapping the small-diameter section 18 in the direction of the third axis C3 decreases from the connecting portion between the portion 33b overlapping the small-diameter section 18 and the portion 33c overlapping the tapered section 19 toward the inside of the insert in the direction of the first axis C1.

In a cross-sectional view perpendicular to the direction of the first axis C1, the outer surface of the projection part 33 is V-shaped which is convex toward the outer side of the insert in the direction of the second axis C2.

In the first modified example, the same operational effect as the above-described embodiment can also be obtained.

The protruding amount of the projection part 33 from the second surface 12 decreases toward the inside of the insert in the direction of the first axis C1. That is, the protruding amount of the projection part 33 decreases as it separates from the cutting edge 5 (in particular, the main cutting edge 14 and the corner cutting edge 21). Therefore, in a portion around the through hole 16 on which the cutting load from the cutting edge 5 easily acts, the protruding amount of the projection part 33 is increased to secure rigidity. In the portion on which the cutting load from the cutting edge 5 is hard to act, the protruding amount of the projection part 33 is decreased and the material cost of the cutting insert 3 can be reduced.

The width of the portion 33b of the projection part 33 overlapping the small-diameter section 18 in the direction of the third axis C3 decreases toward the inside of the insert in the direction of the first axis C1. That is, the width of the portion 33b overlapping the small-diameter section 18 decreases as the portion 33b is away from the cutting edge 5. Therefore, in a portion around the through hole 16 on which the cutting load from the cutting edge 5 easily acts, the width of the portion 33b overlapping the small-diameter section 18 is increased to secure rigidity. In the portion on which the cutting load from the cutting edge 5 is hard to act, by reducing the width of the portion 33b overlapping the small-diameter section 18, the material cost of the cutting insert 3 can be reduced.

Figure 15:
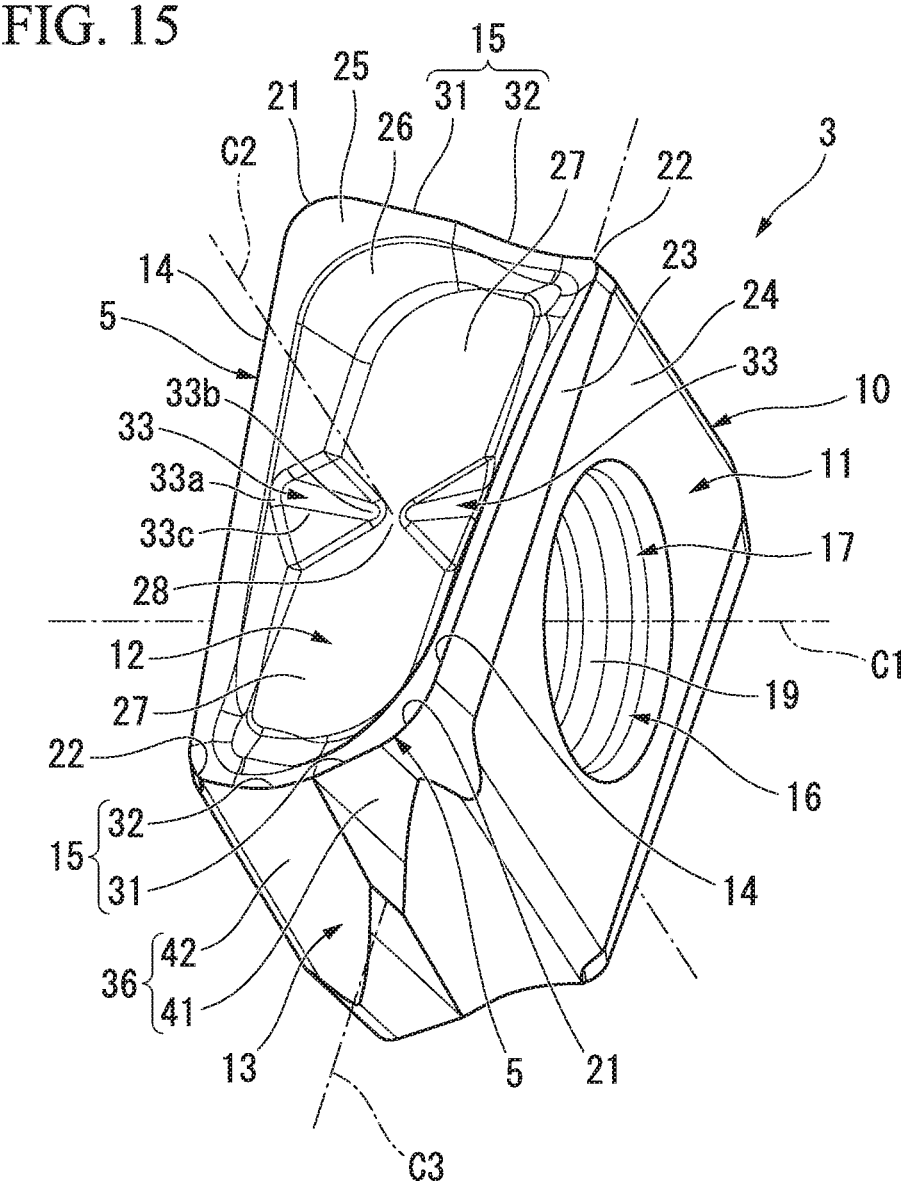
FIG. 15 is a perspective view illustrating a second modified example of the cutting insert.
Figure 16:
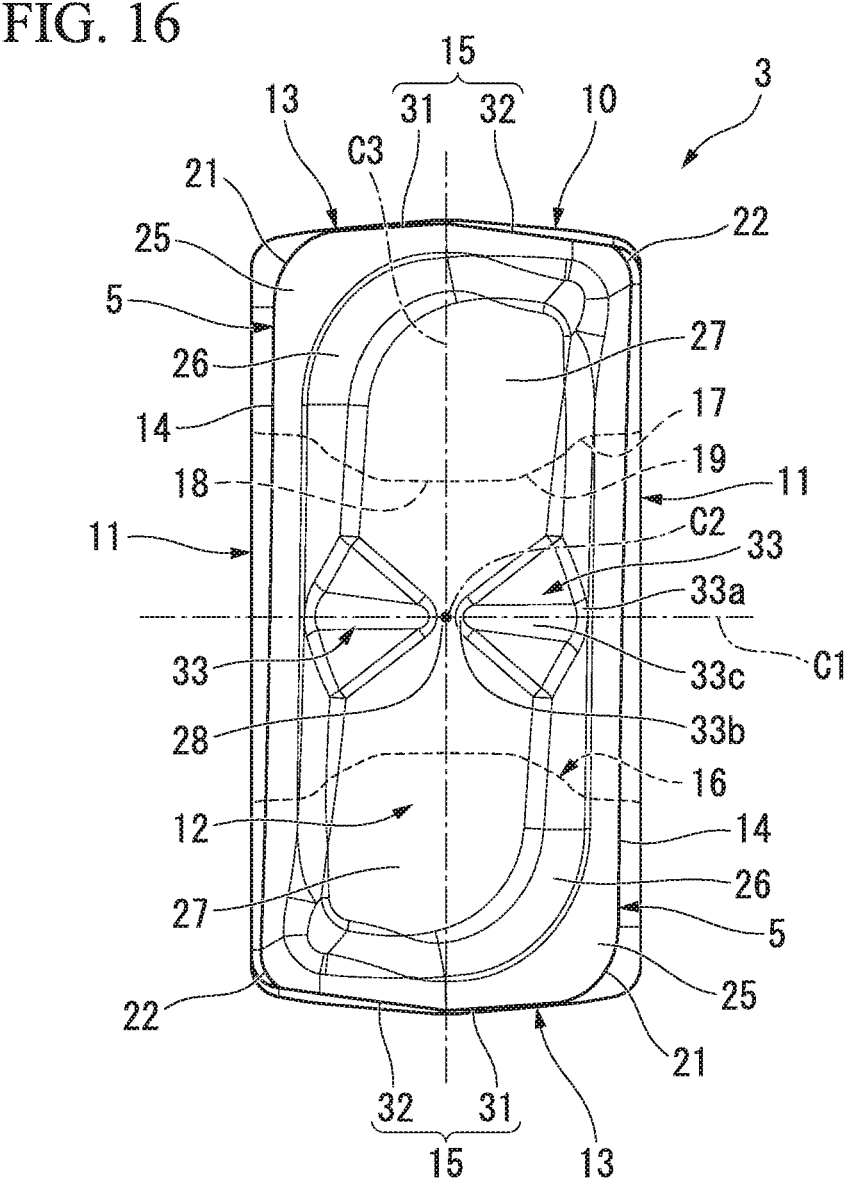
FIG. 16 is a diagram of the cutting insert of FIG. 15 as viewed from the direction of the second axis.

The cutting insert 3 illustrated in FIGS. 15 and 16 is a second modified example of the cutting insert 3 described in the above embodiment.

In a second modified example, a pair of projection parts 33 is provided on the second surface 12 at intervals in the direction of the first axis C1. The protruding amount of the projection part 33 from the second surface 12 in the direction of the second axis C2 decreases as the portion 33b is away from the connecting portion between the projection part 33 and the land 25 in the direction of the first axis C1. In other words, the protruding amount of the projection part 33 from the second surface 12 decreases toward the inside of the insert in the direction of the first axis C1.

As viewed from the direction of the second axis C2, the length (width) of the portion 33b of the projection part 33 overlapping the small-diameter section 18 in the direction of the third axis C3 decreases from the connecting portion between the portion 33b overlapping the small-diameter section 18 and the portion 33c overlapping the tapered section 19 toward the inside of the insert in the direction of the first axis C1.

The second surface 12 has a planar portion connecting portion 28 positioned between the pair of projection parts 33. The planar portion connecting portion 28 is disposed between the pair of planar portions 27 on the second surface 12. The planar portion connecting portion 28 connects the pair of planar portions 27 to each other. The planar portion connecting portion 28 has a planar shape spreading in a direction perpendicular to the second axis C2.

Also in the second modified example, the same operational effects as those of the above-described embodiment and the first modified example can be obtained.

Three or more projection parts 33 may be provided on the second surface 12. The projection part 33 may not have the portion 33b overlapping the small-diameter section 18. In this case, the projection part 33 has a portion 33a overlapping the large-diameter section 17, and a portion 33c overlapping the tapered section 19.

In the above-described embodiment, the insert body 10 is formed in a quadrangular plate shape, but the present invention is not limited thereto. Since the insert body 10 may have a polygonal plate shape, it may have, for example, a triangular plate shape, a pentagonal plate shape, a hexagonal plate shape, a heptagonal plate shape, or the like. Along with this, the shape of the first surface 11 may be a triangular planar shape, a pentagonal planar shape, a hexagonal planar shape, a heptagonal planar shape or the like. Further, the shape of the insert mounting seat 4 may be a triangular hole shape, a pentagonal hole shape, a hexagonal hole shape, a heptagonal hole shape, or the like.

In the above-described embodiment, the insert body 10 is formed to have a front and back reversibly symmetrical shape, but the present invention is not limited thereto. That is, the cutting insert 3 is not limited to a tangential mount double-sided type, but may be a tangential mount single-sided type.

Besides, each configuration (constituent element) described in the above embodiment, modified example and still further writing may be combined within a range that does not depart from the gist of the present invention, and additions, omissions, substitutions, and other changes of configuration can be made. Further, the present invention is not limited by the embodiments described above, but is limited only by the claims.

What is claimed is:

1. A cutting insert comprising:
an insert body having a polygonal plate shape;
a pair of polygonal planar first surfaces;

a through hole which penetrates the insert body, opens to the pair of the first surfaces and extends in a direction of a first axis;

a second surface which is disposed on a circumferential surface of the insert body which connects the pair of first surfaces to each other, and faces a direction of a second axis orthogonal to the direction of the first axis;

a third surface which is disposed on the circumferential surface, is connected to the pair of the first surfaces and the second surface and faces a direction of a third axis orthogonal to the direction of the first axis and different from the direction of the second axis; and cutting edges having a portion located at an intersection ridge line between the first surface and the second surface and a portion located at an intersection ridge line between the second surface and the third surface, wherein the second surface has a projection part protruding in the direction of the second axis from the second surface, as viewed from the direction of the second axis, the through hole and the projection part are disposed to overlap each other, as viewed in the direction of the second axis, the projection part is seen inside the through hole in the direction of the third axis, and the projection part of the second surface has an arc shape that is convex toward an outer side of the insert in the direction of the second axis.

2. The cutting insert according to claim 1, wherein the projection part extends on the second surface in the direction of the first axis.

3. The cutting insert according to claim 1, wherein the through hole has a circular cross section perpendicular to the direction of the first axis, and the projection part protrudes from the second surface a maximum amount in a portion which overlaps the first axis which is a central axis of the through hole as viewed from the direction of the second axis.

4. The cutting insert according to claim 3, wherein the protruding amount of the projection part from the second surface decreases as going away from a portion overlapping the first axis in the direction of the third axis as viewed from the direction of the second axis.

5. The cutting insert according to claim 1, wherein the through hole has a large-diameter section located at an end portion of the insert body in the direction of the first axis, a small-diameter section which has a diameter smaller than the large-diameter section and is located on an inner side of the insert in the direction of the first axis than the large-diameter section, and a tapered section which connects the large-diameter section and the small-diameter section and has an inner diameter decreasing toward the inner side of the insert in the direction of the first axis, and as viewed from the direction of the second axis, the projection part has a portion overlapping at least the large-diameter section.

6. The cutting insert according to claim 5, wherein the projection part has at least one of a portion overlapping the small-diameter section and a portion overlapping the tapered section as viewed from the direction of the second axis, and a protruding amount of a portion of the projection part overlapping the large-diameter section from the second surface toward the direction of the second axis is greater than a protruding amount of a portion overlapping the small-diameter section from the second surface toward the direction of the second axis, and a protruding amount of a portion overlapping the tapered section from the second surface toward the direction of the second axis.

7. The cutting insert according to claim 1, wherein the second surfaces have a pair of planar surfaces located on both sides of the projection part in the direction of the third axis.

8. The cutting insert according to claim 1, wherein in a cross section perpendicular to the direction of the first axis, the through hole has a circular shape, and an outer surface of the projection part has a circular arc shape centered on the first axis which is a central axis of the through hole.

9. The cutting insert according to claim 1, wherein the second surface has a land protruding from the second surface in the direction of the second axis and extending along the cutting edge, and an end of the projection part in the direction of the first axis is connected to the land.

10. The cutting insert according to claim 1, wherein the insert body has a quadrangular plate shape.

11. The cutting insert according to claim 1, wherein the insert body has a front and back reversibly symmetrical shape.

12. An indexable cutting tool comprising:

a tool body to be rotated about a tool axis; and the cutting insert according to claim 1 mounted on the tool body, wherein the tool body has at least one insert mounting seat which is disposed on an outer circumference of a front end of the tool body and to which the cutting insert is detachably mounted, and the insert mounting seat has:

a first wall portion which faces an outer side in a tool radial direction and comes into contact with the first surface, and a second wall portion which faces a tool rotation direction and comes into contact with the second surface, and the second wall portion has:

a support part which supports a portion of the second surface other than the projection part, and a recess in which the projection part is disposed.

13. A cutting insert comprising:

an insert body having a polygonal plate shape;

a pair of polygonal planar first surfaces;

a through hole which penetrates the insert body, opens to the pair of the first surfaces and extends in a direction of a first axis;

a second surface which is disposed on a circumferential surface of the insert body which connects the pair of first surfaces to each other, and faces a direction of a second axis orthogonal to the direction of the first axis;

a third surface which is disposed on the circumferential surface, is connected to the pair of the first surfaces and the second surface and faces a direction of a third axis orthogonal to the direction of the first axis and different from the direction of the second axis; and cutting edges having a portion located at an intersection ridge line between the first surface and the second surface and a portion located at an intersection ridge line between the second surface and the third surface, wherein the second surface has a projection part having an arc shape that is convex toward an outer side of the insert in the direction of the second axis, protruding in the direction of the second axis from the second surface, and as viewed from the direction of the second axis, the through hole and the projection part are disposed to overlap each other.

\* \* \* \* \*